(12) United States Patent
ten Broeke

(10) Patent No.: US 12,326,179 B2
(45) Date of Patent: Jun. 10, 2025

(54) END MEMBER ASSEMBLIES AND GAS SPRING ASSEMBLIES INCLUDING SAME

(71) Applicant: FIRESTONE INDUSTRIAL PRODUCTS COMPANY, LLC, Nashville, TN (US)

(72) Inventor: Edger ten Broeke, Gelderland (NL)

(73) Assignee: Firestone Industrial Products Company, LLC, Nashville, TN (US)

( * ) Notice: Subject to any disclaimer, the term of this patent is extended or adjusted under 35 U.S.C. 154(b) by 353 days.

(21) Appl. No.: 17/272,280

(22) PCT Filed: Sep. 12, 2019

(86) PCT No.: PCT/US2019/050781
§ 371 (c)(1),
(2) Date: Feb. 26, 2021

(87) PCT Pub. No.: WO2020/060834
PCT Pub. Date: Mar. 26, 2020

(65) Prior Publication Data
US 2021/0262545 A1    Aug. 26, 2021

Related U.S. Application Data

(60) Provisional application No. 62/732,809, filed on Sep. 18, 2018.

(51) Int. Cl.
*F16F 7/12* (2006.01)
*F16F 9/05* (2006.01)
(Continued)

(52) U.S. Cl.
CPC .............. *F16F 7/121* (2013.01); *F16F 9/057* (2013.01); *F16F 9/38* (2013.01); *F16F 9/58* (2013.01)

(58) Field of Classification Search
CPC ....................................................... F16F 9/38
See application file for complete search history.

(56) References Cited

U.S. PATENT DOCUMENTS 9,555,817 B2    1/2017  Jackson, Jr.
2010/0127438 A1  5/2010  Eise et al.

FOREIGN PATENT DOCUMENTS

| CA | 2830537 A1 * | 4/2014 | ............. B21D 53/88 |
| DE | 102011050103 A1 * | 11/2012 | ............. B60G 11/27 |
| WO | WO-2014011575 A1 * | 1/2014 | ................ B61F 5/02 |

OTHER PUBLICATIONS

International Search Report and Written Opinion for corresponding PCT Application No. PCT/US2019/050781 dated Dec. 11, 2019.

* cited by examiner

*Primary Examiner* — Melody M Burch

(57) ABSTRACT

End member assemblies dimensioned for securement to a flexible spring member for forming a gas spring assembly include first and second end member sections. The first end member section includes a plurality of first ribs disposed in spaced relation to one another such that a plurality of first grooves are formed therebetween. The second end member section is disposed in abutting engagement with the first end member section. The second end member section includes a plurality of second ribs disposed in spaced relation to one another such that a plurality of second grooves are formed therebetween. The plurality of first ribs and/or the plurality of second ribs are dimensioned for permanent deflection into a respectively adjacent one of the plurality of first and/or second grooves upon undergoing a kinetic impact from an associated foreign object. Gas spring assemblies and suspension systems are also included.

19 Claims, 15 Drawing Sheets

(51) Int. Cl.
*F16F 9/38* (2006.01)
*F16F 9/58* (2006.01)

END MEMBER ASSEMBLIES AND GAS SPRING ASSEMBLIES INCLUDING SAME

This application is the National Stage of International Application No. PCT/US2019/050781, filed on Sep. 12, 2019, which claims the benefit of priority from U.S. Provisional Patent Application No. 62/732,809, filed on Sep. 18, 2018, the subject matter of which is hereby incorporated herein by reference in its entirety.

BACKGROUND

The subject matter of the present disclosure broadly relates to the art of gas spring devices and, more particularly, to end member assemblies that are capable of providing improved impact resistance. Gas spring assemblies including one or more of such end member assemblies are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Generally, the plurality of spring devices function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring devices that have as low of a spring rate as is practical, as the use of lower spring rate devices can provide improved ride quality and comfort compared to spring devices having higher spring rates. That is, it is well understood in the art that the use of spring devices having higher spring rates (i.e., stiffer springs) will transmit a greater magnitude of road inputs into the sprung mass of the vehicle and that this typically results in a rougher, less-comfortable ride. Whereas, the use of spring devices having lower spring rates (i.e., softer, more-compliant springs) will transmit a lesser amount of road inputs into the sprung mass and will, thus, provide a more comfortable ride.

In some cases, the spring devices of vehicle suspension systems can be of a type and kind that are commonly referred to in the art as gas springs (or gas spring assemblies), which are understood to utilize pressurized gas as the working medium thereof. Typically, such gas spring assemblies include a flexible spring member that is operatively connected between comparatively rigid end members to form a spring chamber. Pressurized gas can be transferred into and/or out of the spring chamber to alter the position of the sprung and unsprung masses relative to one another and/or to provide other performance-related characteristics.

Generally, it is possible to reduce the spring rate of gas springs, thereby improving ride comfort and/or other performance characteristics, by increasing the volume of pressurized gas operatively associated with a gas spring. This is commonly done by placing an additional chamber, cavity or volume filled with pressurized gas into fluid communication with the primary spring chamber of the gas spring. In some cases, all or a portion of the additional volume of pressurized gas can be provided through the use of an end member or end member assembly that at least partially defines an internal reservoir or chamber. In such constructions, an increased volume of pressurized gas can be included within the gas spring beyond that defined by the flexible spring member alone.

It will be recognized and appreciated that a wide variety of different constructions for such so-called reservoir end members are known and commonly used. However, it has been recognized that conventional constructions for reservoir end members can have one or more undesirable characteristics. One example of a disadvantage of conventional constructions is that the same often include a larger exposed external surface area when compared with other types and kinds of gas spring end members, such as those commonly referred to as bead plates, for example.

Conventional gas spring end members are often designed and constructed to withstand conditions (e.g., exposure to outdoor weather conditions) associated with use in operation during over-the-road travel and/or under use in similar environments, such as impacts from road debris and/or other foreign objects. In some cases, the additional exposed external surface area commonly associated with conventional reservoir end member constructions may result in encounters with road debris and/or other foreign objects that are of an increased frequency and/or magnitude. In some cases, such encounters could result in a decreased ability of the reservoir end member to retain pressurized gas and/or undesirably alter one or more other performance characteristics of the gas spring assembly.

Notwithstanding the widespread usage and overall success of the wide variety of end member designs that are known in the art, it is believed that a need exists to meet these competing goals while still retaining comparable or improved performance and/or providing other beneficial characteristics. Accordingly, it is believed desirable to develop end member assemblies that overcome the foregoing and/or other areas for improvement associated with known designs, and/or otherwise advance the art of gas spring devices.

BRIEF DESCRIPTION

One example of an end member assembly in accordance with the subject matter of the present disclosure is dimensioned for securement to an associated flexible spring member for forming an associated gas spring assembly. The end member assembly can include a first end member section having a longitudinal axis and including a first end member wall portion extending peripherally about the longitudinal axis and longitudinally from a first end toward a second end. The first end member wall portion includes a plurality of first ribs disposed in spaced relation to one another such that a plurality of first grooves are formed with one of the plurality of first grooves disposed between two of the plurality of first ribs. A second end member section is disposed in abutting engagement with the first end member section. The second end member section can include a second end member wall portion extending peripherally about the longitudinal axis and longitudinally from a first end toward a second end. The second end member wall portion can include a plurality of second ribs disposed in spaced relation to one another such that a plurality of second grooves are formed with one of the plurality of second grooves disposed between two of the plurality of second ribs. At least one of the plurality of first ribs and at least one of the plurality of second ribs dimensioned for permanent deflection into a respectively adjacent one of the plurality of first grooves and the plurality of second grooves upon undergoing a kinetic impact from an associated foreign object.

One example of a gas spring assembly in accordance with the subject matter of the present disclosure can include a flexible spring member having a longitudinal axis and extending between opposing first and second ends. The flexible spring member can include a flexible wall extending peripherally about the longitudinal axis to at least partially define a spring chamber. An end member assembly according to the foregoing paragraph can be secured across the first end of the flexible spring member such that a substantially fluid-tight connection is formed therebetween.

Another example of a gas spring assembly in accordance with the subject matter of the present disclosure can include a flexible spring member having a longitudinal axis and extending between opposing first and second ends. The flexible spring member can include a flexible wall extending peripherally about the longitudinal axis to at least partially define a spring chamber. An end member assembly can be secured across the first end of the flexible spring member such that a substantially fluid-tight connection is formed therebetween. The end member assembly can include a side wall portion, a plurality of ribs and a peripheral wall portion. The side wall portion can extend peripherally about the longitudinal axis and at least partially forms an exterior of the end member assembly. The plurality of ribs being outwardly exposed along the exterior of the end member assembly and disposed in spaced relation to one another such that a plurality of grooves are formed with one of the plurality of grooves disposed between adjacent ones of the plurality of ribs. The plurality of ribs extend lengthwise in a longitudinal direction along at least the side wall portion between a plurality of first rib ends disposed toward the flexible spring member and a plurality of second rib ends disposed in spaced relation to the first rib ends in a direction away from the flexible spring member. The peripheral wall portion extends peripherally between and operatively interconnects the plurality of ribs. The peripheral wall portion is positioned lengthwise along the plurality of ribs in spaced relation to the first and second rib ends.

One example of a suspension system in accordance with the subject matter of the present disclosure can include a pressurized gas system that includes a pressurized gas source and a control device. The suspension system can also include at least one gas spring assembly according to either of the foregoing two paragraphs. The at least one gas spring assembly can be disposed in fluid communication with the pressurized gas source through the control device such that pressurized gas can be selectively transferred into and out of the spring chamber.

DETAILED DESCRIPTION

Turning now to the drawings, it is to be understood that the showings are for purposes of illustrating examples of the subject matter of the present disclosure and which are not intended to be limiting. Additionally, it will be appreciated that the drawings are not to scale and that portions of certain features, elements and/or structures may be exaggerated for purposes of clarity and/or ease of understanding.

Figure 1:
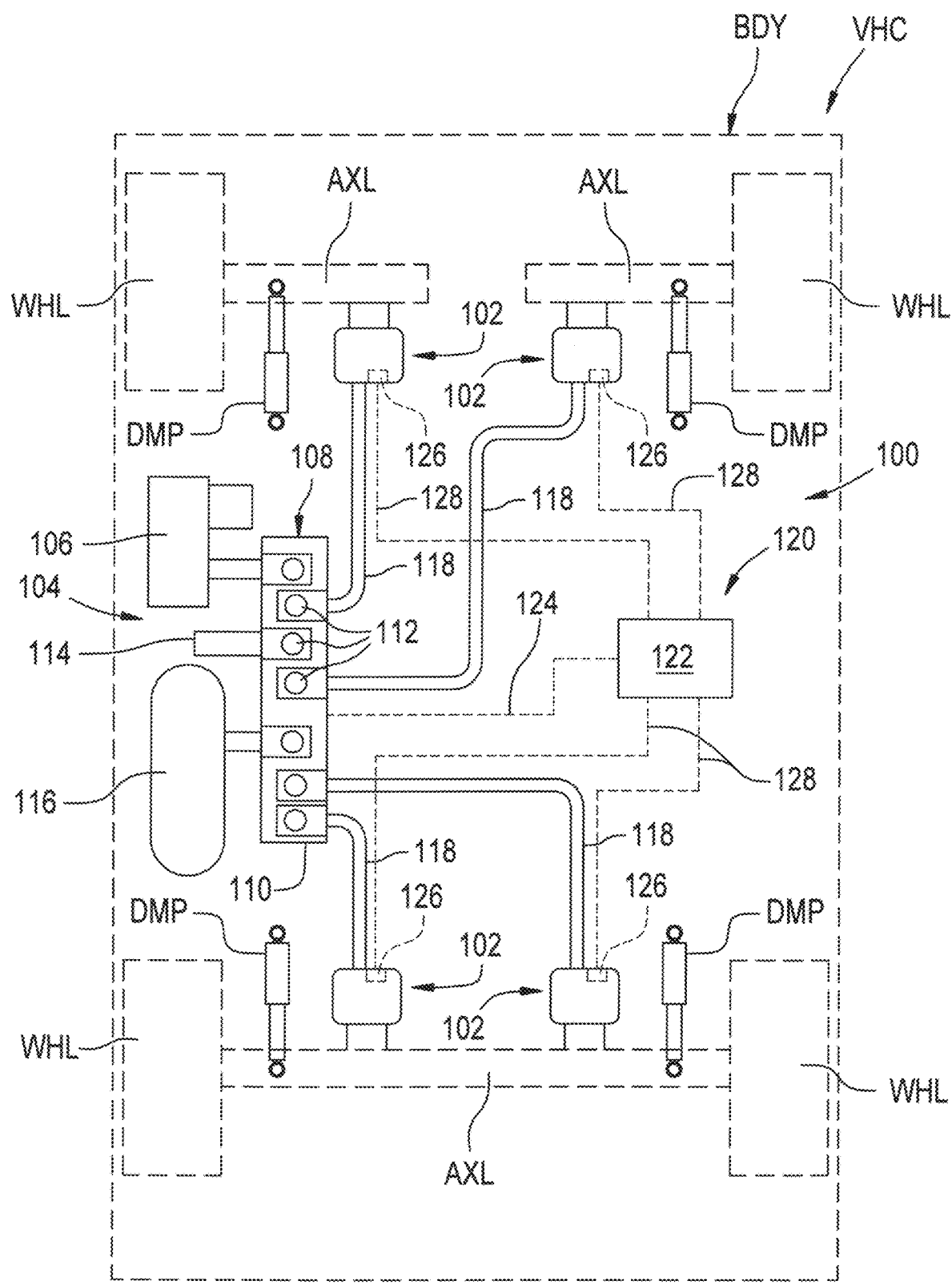
FIG. 1 is a schematic representation of one example of a suspension system of an associated vehicle that includes gas spring assemblies in accordance with the subject matter of the present disclosure.
Figure 2:
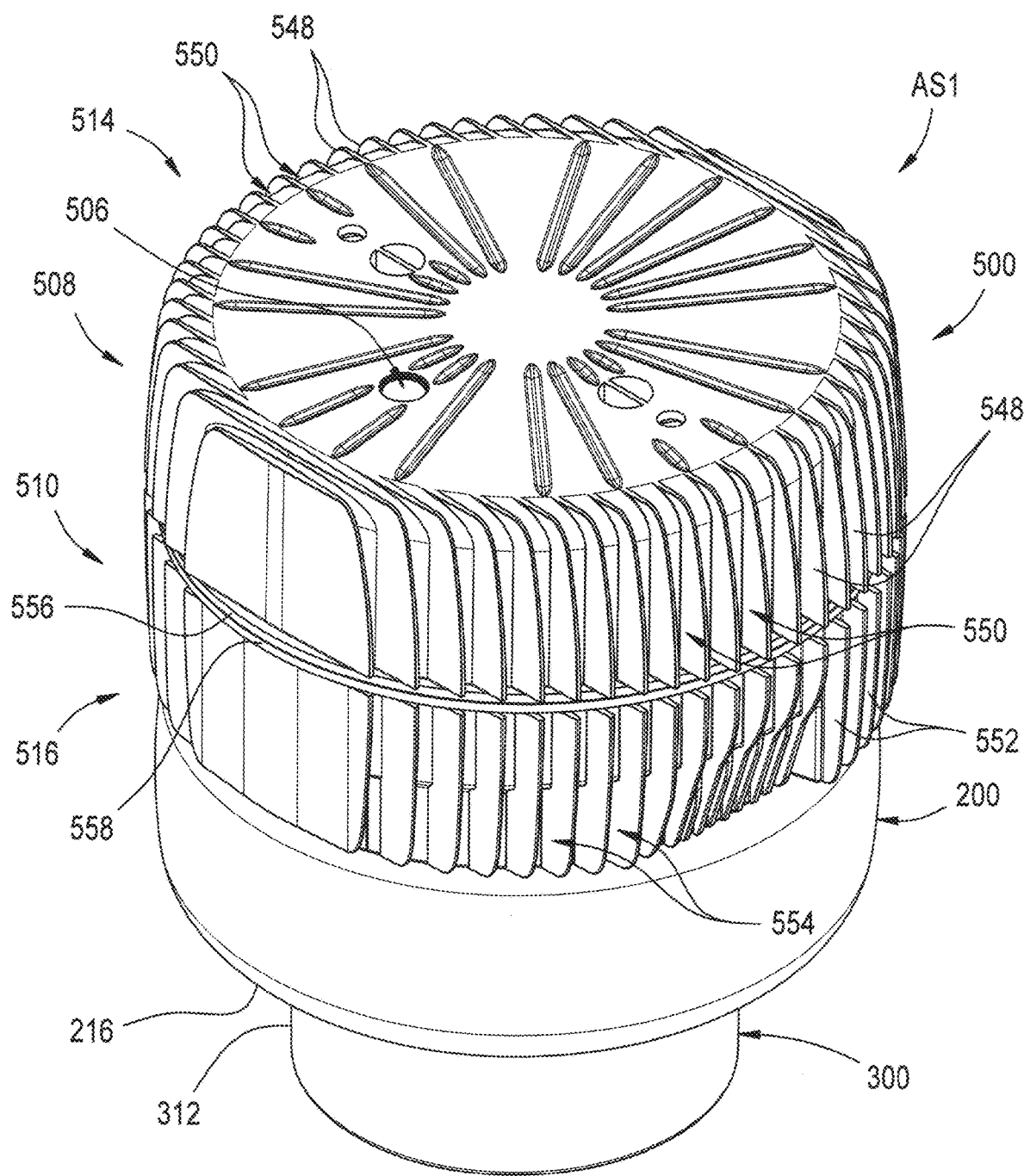
FIG. 2 is a top perspective view of one example of a gas spring assembly in accordance with the subject matter of the present disclosure.
Figure 3:
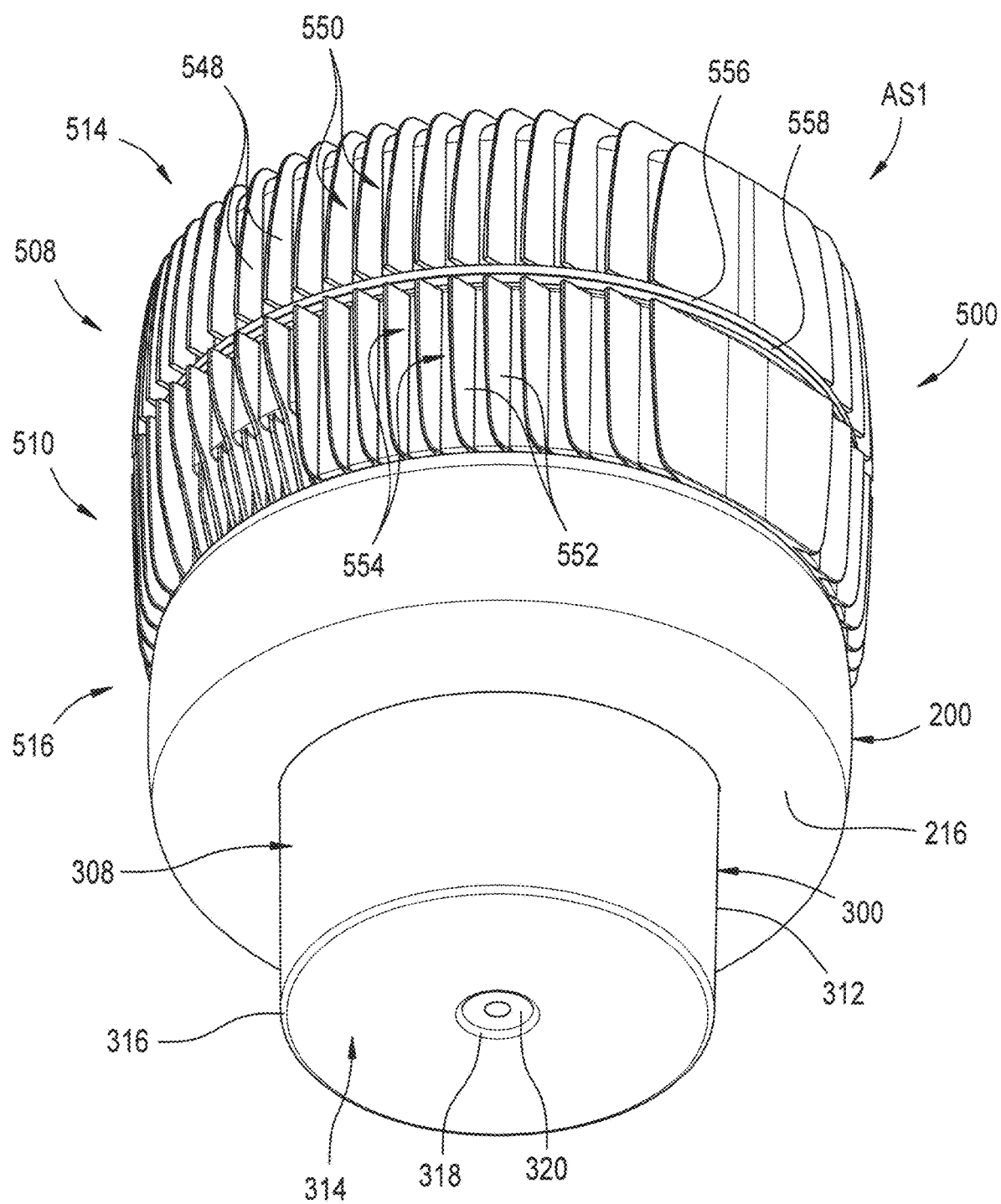
FIG. 3 is a bottom perspective view of the exemplary gas spring assembly in FIG. 2.

FIG. 1 illustrates one example of a suspension system 100 disposed between a sprung mass, such as an associated vehicle body BDY, for example, and an unsprung mass, such as an associated wheel WHL, an associated suspension component SCP or an associated axle AXL, for example, of an associated vehicle VHC. It will be appreciated that any one or more of the components of the suspension system can be operatively connected between the sprung and unsprung masses of the associated vehicle in any suitable manner.

For example, suspension system 100 can include a plurality of gas spring assemblies 102 in accordance with the subject matter of the present disclosure that are supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration and/or arrangement. As shown in FIG. 1, gas spring assemblies 102 are supported between suspension components SCP and/or axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Depending on desired performance characteristics and/or other factors, the suspension system may, in some cases, include damping members, such as dampers DMP, for example, of a typical construction (e.g., conventional struts or shock absorbers). In some cases, any such one or more damping members can be provided separately from gas spring assemblies 102, and secured between the sprung and unsprung masses in a conventional manner. In other cases, the damping members can be assembled together with a gas spring assembly such that at least a portion of the damping member is axially coextensive with the gas spring assembly.

Suspension system 100 also includes a pressurized gas system 104 operatively associated with the gas spring assemblies for selectively supplying pressurized gas (e.g., air) thereto and selectively transferring pressurized gas therefrom. In the exemplary arrangement shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also, optionally, include a suitable exhaust, such as a muffler 114, for example, for venting pressurized gas from the system. Optionally, pressurized gas system 104 can also include a reservoir 116 in fluid communication with compressor 106 and/or valve assembly 108, and suitable for storing pressurized gas at an elevated pressure (i.e., greater than atmospheric pressure) for an extended period of time, such as minutes, hours, days, weeks or months, for example.

Valve assembly 108 can be in communication with gas spring assemblies 102 in any suitable manner, such as through suitable gas transfer lines 118, for example. As such, pressurized gas can be selectively transferred into and/or out of the gas springs assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices 126, such as, for example, may be operatively associated with the gas spring assemblies and capable of outputting or otherwise generating data, signals and/or other communications having a relation to a height of the gas spring assemblies or a distance between other components of the vehicle. Height sensing devices 126 can be in communication with ECU 122, which can receive the height or distance signals therefrom. The height sensing devices can be in communication with ECU 122 in any suitable manner, such as through conductors or leads 128, for example. Additionally, it will be appreciated that the height sensing devices can be of any suitable type, kind and/or construction, such as may operate using sound, pressure, light and/or electromagnetic waves, for example.

Having described an example of a suspension system (e.g., suspension system 100) that can include gas spring assemblies in accordance with the subject matter of the present disclosure (e.g., gas spring assemblies 102), one example of such a gas spring assembly will now be described in connection with FIGS. 2-10. As shown therein, a gas spring assembly AS1, such as may be suitable for use as one or more of gas spring assemblies 102 in FIG. 1, for example, is shown as having a longitudinal axis AX (FIG. 6) and can include a flexible spring member 200. Gas spring assembly AS1 can also include an end member (or end member assembly) 300 that can be secured to the flexible spring member in a suitable manner, such as by way of a clamping plate 400, for example. Gas spring assembly AS1 can also include an end member (or end member assembly) 500 in accordance with the subject matter of the present disclosure that is secured to the flexible spring member in a suitable manner in spaced relation to end member 300. Flexible spring member 200 can be secured on or along end members 300 and/or 500 in a substantially fluid-tight manner such that a spring chamber 202 (FIG. 6) is at least partially defined by the flexible spring member between the end members.

Figure 4:
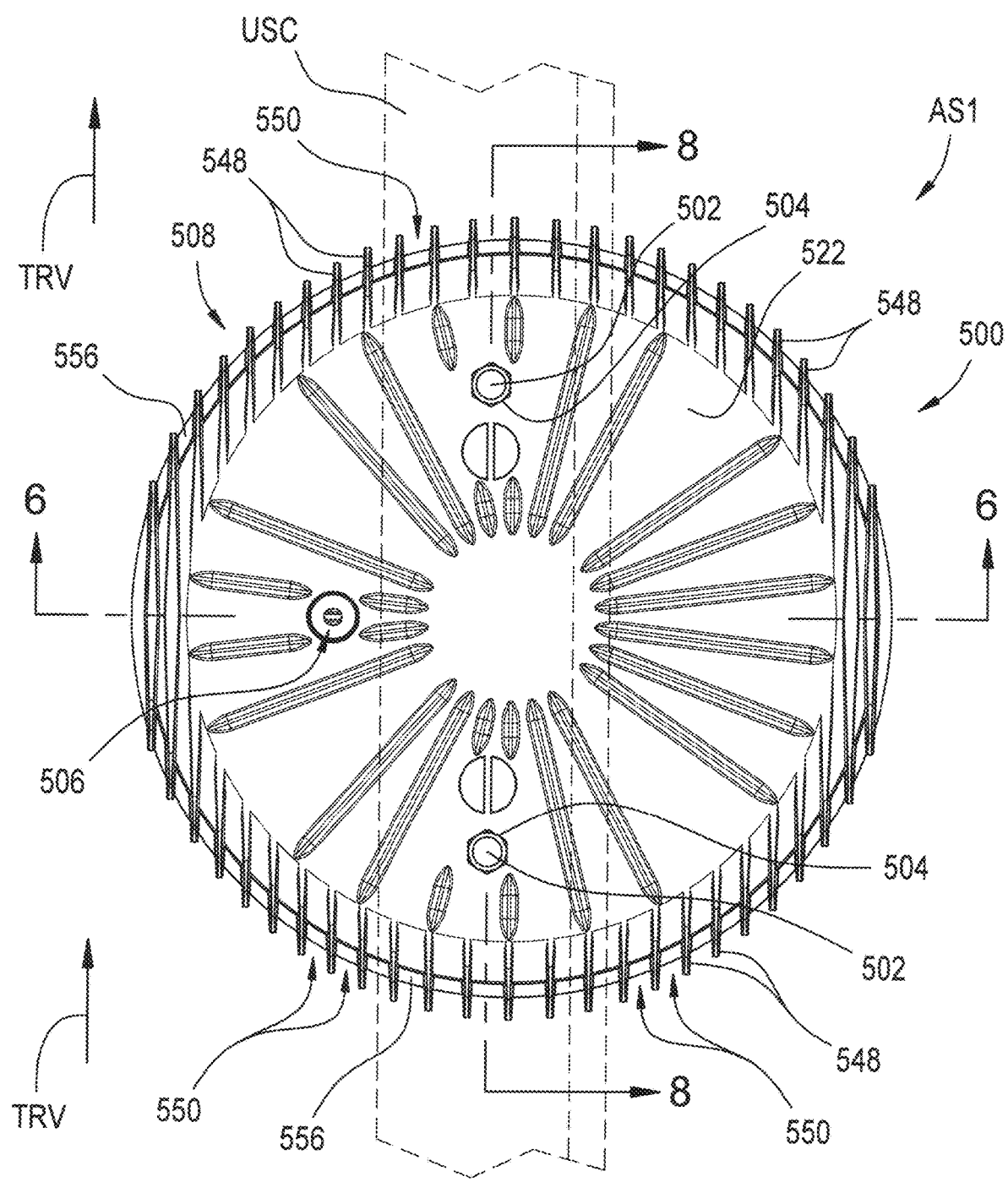
FIG. 4 is a top plan view of the exemplary gas spring assembly in FIGS. 2 and 3.

Gas spring assembly AS1 can be disposed between associated sprung and unsprung masses of an associated vehicle in any suitable manner. For example, one end member can be operatively connected to the associated sprung mass with the other end member disposed toward and operatively connected to the associated unsprung mass. As shown in FIG. 4, for example, end member assembly 500 can be secured on or along a first or upper structural component USC, such as associated vehicle body BDY in FIG. 1, for example, and can be secured thereon in any suitable manner. For example, one or more securement devices, such as mounting studs 502, for example, can be included along end member assembly 500. In some cases, the one or more securement devices (e.g., mounting studs 502) can project outwardly from end member assembly 500 and can be secured thereon in a suitable manner, such as, for example, by being insert molded and/or by way of a flowed-material joint, a press-fit connection, or a snap-in connection. Additionally, such one or more securement devices can extend through mounting holes (not shown) in upper structural component USC and can receive one or more threaded nuts 504 or other securement devices, for example. As an alternative to one or more of mounting studs 502, one or more threaded passages (e.g., blind passages and/or through passages) could be used in conjunction with a corresponding number of one or more threaded fasteners, for example.

Additionally, one or more fluid communication ports, such as transfer passages 506, for example, can, optionally, be provided to permit fluid communication with spring chamber 202, such as may be used for transferring pressurized gas into and/or out of the spring chamber, for example. It will be appreciated, however, that any other suitable fluid communication arrangement could alternately be used.

End member assembly 300 can be secured on or along a second or lower structural component LSC, such as a suspension component SCP and/or an axle AXL in FIG. 1, for example, in any suitable manner. As one example, lower structural component LSC could include one or more mounting holes HLS extending therethrough. In such case, a threaded fastener 302 (FIG. 6) could extend through one of mounting holes HLS and threadably engage end member 300 or another component of the assembly to secure the end member on or along the lower structural component.

Flexible spring member 200 can be of any suitable size, shape, construction and/or configuration. As one example, flexible spring member 200 can include a flexible wall 204 that is at least partially formed from one or more layers or plies of elastomeric material (e.g., natural rubber, synthetic rubber and/or thermoplastic elastomer) and can optionally include one or more plies or layers of filament reinforcing material. Flexible wall 204 is shown extending in a longitudinal direction between opposing ends 206 and 208. In some cases, flexible spring member 200 can, optionally, include a mounting bead disposed along either one or both of ends 206 and 208 of the flexible wall. In the arrangement shown in FIG. 6, for example, mounting beads 210 and 212 are shown as being respectively disposed along ends 206 and 208. In some cases, the mounting beads can, optionally, include a reinforcing element, such as an endless, annular bead wire 214, for example.

End member 300 extends longitudinally between a first or upper end 304 and a second or lower end 306. First end 304 is adapted to receivingly engage end 208 of flexible spring member 200. Second end 306 of end member 300 is adapted to abuttingly engage an associated structural component, such as has been described above in connection with lower structural component LSC, for example.

End member 300 includes an end member body or shell 308 and can also, optionally, include one or more additional components and/or elements. End member body 308 has a first or outer side wall (or wall portion) 310 that extends generally longitudinally between first and second ends 304 and 306. In an assembled condition and during use, a portion of flexible spring member 200 forms a rolling lobe 216 that is displaced along an outer surface (or surface portion) 312 of outer side wall 310 as the gas spring assembly undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of gas spring end members. As such, it will be appreciated that the profile of outer surface 312 of outer side wall 310 is merely exemplary.

End member 300 can also include an end member base 314 that is received within or otherwise disposed along an open end (not numbered) of end member shell 308 along end 306 of end member 300. End member base 314 can be secured on or along end member shell 308 in any suitable manner, such as, for example, by welding the end member base and the end member shell together, as indicated by all-around flowed-material joint 316, for example. A mounting hole 318 can, optionally, extend through end member base 314. Threaded inserts 320 can be secured, such as by flowed-material joints 322, for example, on end member base 314 adjacent mounting hole 318.

Outer side wall 310 of end member shell 308 extends generally longitudinally between first and second ends 304 and 306. End member shell 308 also includes an end wall (or end wall portion) 324 that is disposed radially inward of outer side wall 310. End wall 324 can be operatively connected to outer side wall 310 in any suitable manner. For example, end member shell 308 can include a frustoconical wall (or wall portion) 326 disposed radially outward of end wall 324. End member shell 308 can also include a shoulder wall (or wall portion) 328 that extends between and operatively connects outer side wall 310 and frustoconical wall 326 such that end 304 of end member 300 has a somewhat dish-shaped configuration that is dimensioned to receive a portion of flexible spring member 200 and at least a portion of clamping plate 400. It will be appreciated, however, that other configurations and/or arrangements could alternately be used.

End member shell 308 and end member base 314 together at least partially define an end member chamber 330 within end member 300. In some cases, an inner support wall (or wall portion) 332 can, optionally, be provided that extends generally longitudinally between end wall 324 of end member shell 308 and end member base 314. It will be appreciated that inner support wall 332, if provided, can be secured on or along end wall 324 and/or end member base 314 in a suitable manner, such as by way of one or more flowed-material joints 334. One or more passage and/or openings 332A can be included on or between inner support wall 332 and the end wall of the end member shell and/or the end member base to permit the portions of end member chamber 330 inside and outside of inner support wall 332 to be in fluid communication with one another.

As mentioned above, the end member can be secured on or along an associated structural component, such as lower structural component LSC, for example, in any suitable manner and through the use of any suitable combination of components. Similarly, clamping plate 400 can be secured on or along end member 300 in any suitable manner and through the use of any suitable combination of components. For example, a mounting hole 336 can, optionally, extend through end wall 324. A threaded insert 338 can be secured on or along end wall 324 in communication with the mounting hole, such as by way of a flowed-material joint 340, for example. In such case, a bumper mount 342 can extend through clamping plate 400 and into engagement with threaded insert 338. Bumper mount 342 can be threadably engaged with threaded insert 338 such that clamping plate 400 and/or a portion of flexible spring member 200 (e.g., mounting bead 212) can be secured in a substantially fluid-tight arrangement with end member shell 308. In some cases, a portion of bumper mount 342 will extend axially outwardly beyond clamping plate 400 and project into spring chamber 202. In such case, a jounce bumper 344 of any suitable type, kind, construction and/or configuration can be received on bumper mount 342 and/or otherwise secured within spring chamber 202 of gas spring assembly AS1.

End member chamber 330 can be disposed in fluid communication with spring chamber 202 such that gas transfer between the spring chamber and the end member chamber can generate pressurized gas damping during use of a gas spring assembly in accordance with the subject matter of the present disclosure (e.g., gas spring assembly AS1). As such, end member shell 308 can include one or more holes and/or passages extending through one or more walls (or wall portions) thereof and through which spring chamber 202 and end member chamber 330 can fluidically communicate with one another. As one example, end member shell 308 includes a passage or opening 346 (FIG. 6) extending through end wall 324. In a preferred arrangement, opening 346 will be disposed in fluid communication with an elongated damping passage extending through clamping plate 400. In such case, it may be desirable to provide one or more alignment and/or indexing features on or along end member shell 308. As one example, end member shell 308 can include a hole or opening 348 (FIG. 6) extending through end wall 324 in a predetermined angular orientation relative to opening 346. Additionally, or as an alternative, one or more projections could be included on or along the end wall of the end member shell.

Figure 6:
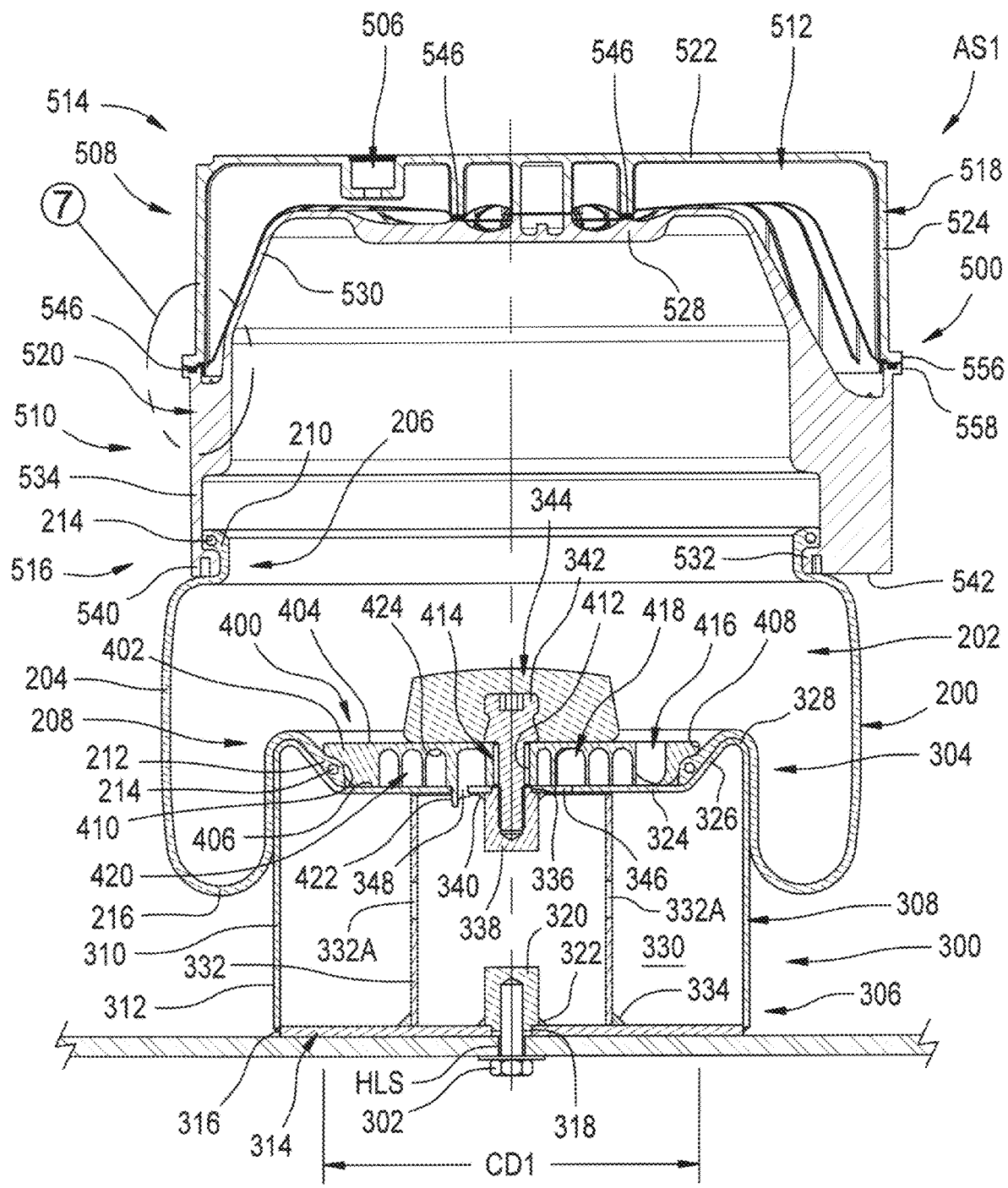
FIG. 6 is a cross-sectional side view of the exemplary gas spring assembly in FIGS. 2-5 taken from along line 6-6 in FIG. 4.

With reference, now, to FIG. 6, clamping plate 400 is shown as including a clamping plate wall 402 that extends around and radially outward from axis AX in transverse relation thereto. Clamping plate wall 402 includes a surface (or surface portion) 404 disposed along one side of clamping plate 400 and a surface (or surface portion) 406 disposed along another side of clamping plate 400. In a preferred arrangement, surfaces 404 and 406 can be approximately planar, and/or surface 406 can be shaped cooperatively with end wall 324 of end member shell 308. Clamping plate wall 402 also includes an outer peripheral surface (or surface portion) 408 that extends axially between and operatively connects surfaces 404 and 406.

It will be appreciated that outer peripheral surface 408 can be of any suitable size, shape and/or configuration. For example, outer peripheral surface 408 can be curved or otherwise non-linear, and can at least partially define an annular recess 410 formed along the outer periphery of the clamping plate wall. In some cases, annular recess 410, if provided, can be dimensioned to receive at least a portion of mounting bead 212 of flexible spring member 200, such as is shown in FIG. 6, for example. Regardless of the shape and/or configuration of clamping plate wall 402 and outer peripheral surface 408 thereof, it will be appreciated that clamping plate 400 will have an outermost cross-sectional dimension (e.g., a diameter) that extends generally thereacross, such as is represented in FIG. 6 by reference dimension CD1, for example.

As discussed above, clamping plate 400 can be secured on or along end member 300 in any manner suitable for urging a portion (e.g., mounting bead 212) of flexible spring member 200 into abutting engagement with a wall or wall portion (e.g., frustoconical wall 326) of end member 300. As one example, bumper mount 342 can be used to secure the clamping plate on end member 300, as discussed above. In such case, clamping plate wall 402 can include a passage surface (or surface portion) 412 that at least partially defines a hole or passage 414 extending through clamping plate 400. In a preferred arrangement, hole 414 is dimensioned to receive at least a portion of bumper mount 342 such that the same can extend through hole 414 and engage threaded insert 338. In some cases, a surface or shoulder (not numbered) of bumper mount 342 can abuttingly engage surface 404 of clamping plate wall 402. One or more additional features and/or elements can, optionally, be included on or along surface 404. Clamping plate 400 includes an opening or port 416 that extends into clamping plate wall 402 and is accessible from along surface 404. Clamping plate 400 also includes an opening or port 418 that extends into clamping plate wall 402 and is accessible from along surface 406. In the construction shown in FIG. 6, opening 416 is disposed in a radially outward position that is adjacent or otherwise toward outer peripheral surface 408, and opening 418 is disposed in a position that is radially inward of opening 416 and generally toward axis AX.

It will be appreciated that a gas spring assembly in accordance with the subject matter of the present disclosure can, optionally, include one or more elongated gas damping passages fluidically connected between the spring chamber and one or more end member chambers. In such constructions, pressurized gas damping performance exceeding that provided by conventional gas damping orifice designs can be achieved through the use of such one or more elongated gas damping passages, particularly with respect to a given or otherwise predetermined range of frequencies of vibration or other dynamic input. For example, a gas spring assembly in accordance with the subject matter of the present disclosure can, optionally, include an elongated gas damping passage in fluid communication between the spring chamber and one or more end member chambers (e.g., end member chamber 330). Differential pressure between the spring chamber and the one or more end member chambers can induce gas flow along at least a portion of the length of the elongated gas damping passage. It will be appreciated that such movement of the pressurized gas within and/or through an elongated gas damping passage can act to dissipate kinetic energy acting on the assembly and/or system.

As on example, clamping plate 400 can further include an elongated damping passage 420 extending through clamping plate wall 402. Elongated damping passage 420 has a first end (not numbered) disposed in fluid communication with opening 416 and a second end (not numbered) disposed in fluid communication with opening 418. In some cases, elongated damping passage 420 can have an overall length that is at least approximately one and one-half (1-1/2) times the outermost cross-sectional dimension of clamping plate 400, such as is represented by reference dimension CD1, for example. In some cases, the overall length of elongated damping passage can be at least approximately two (2) times the outermost cross-sectional dimension of clamping plate 400 and, in some cases, at least approximately four (4) times the outermost cross-sectional dimension of clamping plate 400. In this manner, an elongated damping passage having an overall length that is substantially greater than the outermost cross-sectional dimension of the clamping plate can be used.

Utilizing such a construction, clamping plate 400 can secure flexible spring member 200 on or along end member 300 while generating pressurized gas damping as pressurized gas flows between spring chamber 202 and end member chamber 330 through elongated damping passage 420 and openings 416 and 418. Clamping plate 400 can be oriented relative to end member 300 such that opening 418 is disposed in fluid communication with opening 346 of end member shell 308. As such, it may be desirable to provide one or more alignment and/or indexing features on or along clamping plate wall 402. As one example, clamping plate wall 402 can include a projection 422 extending axially outwardly from along surface 406 in a predetermined angular orientation relative to opening 418. Additionally, or as an alternative, one or more holes or openings could be included on or along the clamping plate wall of the clamping plate. Cooperative engagement of an alignment or indexing feature (e.g., projection 422) of clamping plate 400 with an alignment or indexing feature (e.g., opening 348) of end member 300 can aid in assembly and assist in ensuring that openings 346 and 418 are at least approximately aligned and in fluid communication with one another.

Clamping plate wall 402 can include a passage surface 424 that at least partially defines elongated damping passage 420. It will be appreciated that passage surface 424 can have any suitable cross-sectional shape and/or profile. Elongated damping passage 420 can have a spiral-like configuration. Such a spiral-like or similar configuration can be generated in any suitable manner. For example, the cross-sectional profile of passage surface 424 can be oriented transverse to axis AX and can be substantially-continuously rotated about the axis with the cross-sectional profile substantially-continuously displaced radially outward from adjacent axis AX to form the spiral-like configuration. In some cases, such rotation of the cross-sectional profile of passage surface 424 can occur in an approximately single plane such that the spiral-like configuration of elongated damping passage 420 is disposed in a common plane that is oriented transverse to longitudinal axis AX.

It will be appreciated that clamping plate 400 can be operatively engaged with a portion (e.g., mounting bead 212) of flexible spring member 200 in any manner suitable for urging the portion of the flexible spring member into abutting engagement with a wall or wall portion (e.g., frustoconical wall 326) of end member 300. In some cases, clamping plate 400 can be maintained as an individual component of the gas spring assembly that is separable from or otherwise removably secured to flexible spring member 200 and end member 300. In other cases, the clamping plate can be permanently secured or otherwise attached to one or more components of the gas spring assembly. For example, a portion (e.g., mounting bead 212) of flexible spring member 200 can be adhered, vulcanized, cured or otherwise permanently attached (i.e., inseparable without damage, destruction or material alteration of at least one of the component parts) to clamping plate 400 or a surface portion thereof (e.g., outer peripheral surface 408 and/or annular recess 410).

End member (or end member assembly) 500 can be operatively secured along or across end 206 of flexible spring member 200 such that a substantially fluid-tight seal is formed therebetween. End member assembly 500 can take the form of a reservoir end member that includes at least one end member wall that defines an end member chamber. In the arrangement shown, end member assembly 500 includes a first or upper section 508 and a second or lower section 510 that are operatively attached to one another to at least partially form end member assembly 500. In an assembled condition, one or more of first and second sections 508 and 510 can at least partially define an end member chamber 512 within end member assembly 500. It will be appreciated, however, that other constructions and/or configurations can alternately be used without departing from the subject matter of the present disclosure.

End member assembly 500 can extend longitudinally between a first end 514 and a second end 516. It will be appreciated that first and second end member sections 508 and 510 can be formed from any suitable number of walls and/or wall portions. First end member section 508 can include a section wall 518 with one or more section wall portions and second end member section 510 can include a section wall 520 with one or more section wall portions. For example, section wall 518 can include an end wall portion 522 oriented transverse to longitudinal axis AX and along which mounting studs 502 can be secured and/or along which transfer passage 506 can be provided. Section wall 518 can also include an outer side wall portion 524 that extends lengthwise from along end wall portion 522 and/or first end 514 in a direction toward second end 516 to a distal edge 526. As another example, section wall 520 can include an end wall portion 528 oriented transverse to longitudinal axis AX. Section wall 520 can also include an inner side wall portion 530 that extends lengthwise from along end wall portion 528 and/or first end 514 in a direction toward second end 516. A mounting wall portion 532 can be disposed distal of inner side wall portion 530 in a direction opposite end wall portion 528. If provided, mounting wall portion 532 can be dimensioned to receive and retain mounting bead 210 of flexible spring member 200.

Section wall 520 can also include an outer side wall portion 534 that is disposed radially outward of inner side wall portion 530 such that a space or gap is formed therebetween. Inner and outer side wall portions 530 and 534 can be operatively connected with one another in any suitable manner. For example, section wall 520 can include a connector wall portion 536 that is oriented transverse to longitudinal axis AX. Connector wall portion 536 can extend between and operatively connect inner and outer side wall portions 530 and 534. Outer side wall portion 534 can extend from along connector wall portion 536 lengthwise in a longitudinal direction toward first end 514 to a distal edge 538. In some cases, outer side wall portion 534 can also, optionally, extend from along connector wall portion 536 in a longitudinal direction away from first end 514 and thereby at least partially form an outer side wall extension portion 540 having a distal edge 542.

In an assembled condition of end member assembly 500, one or more walls and/or wall portions of one or more of first and second end member sections 508 and 510 at least partially define end member chamber 512. In the exemplary arrangement shown in FIGS. 2-10, end member chamber 512 is at least partially formed by one or more walls and/or wall portions of the first and second end member sections, such as end wall portion 522 and outer side wall portion 524 together with end wall portion 528 and inner side wall portion 530, for example. Optionally, a gas spring assembly in accordance with the subject matter of the present disclosure can include one or more gas damping passages or ports 544 fluidically connected between end member chamber 512 and spring chamber 202. In such constructions, gas damping passages or ports 544 can be dimensioned such that pressurized gas flows into, out of and/or otherwise is displaced through the gas damping passage or passages as the gas spring assembly undergoes dynamic use in operation. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermine range of frequencies. Where another chamber or volume is also included that also provides pressurized gas damping (e.g., elongated damping passage 420 between end member chamber 330 and spring chamber 202), it may be preferable to target two or more predetermined natural frequencies or predetermined ranges of frequencies.

Figure 7:
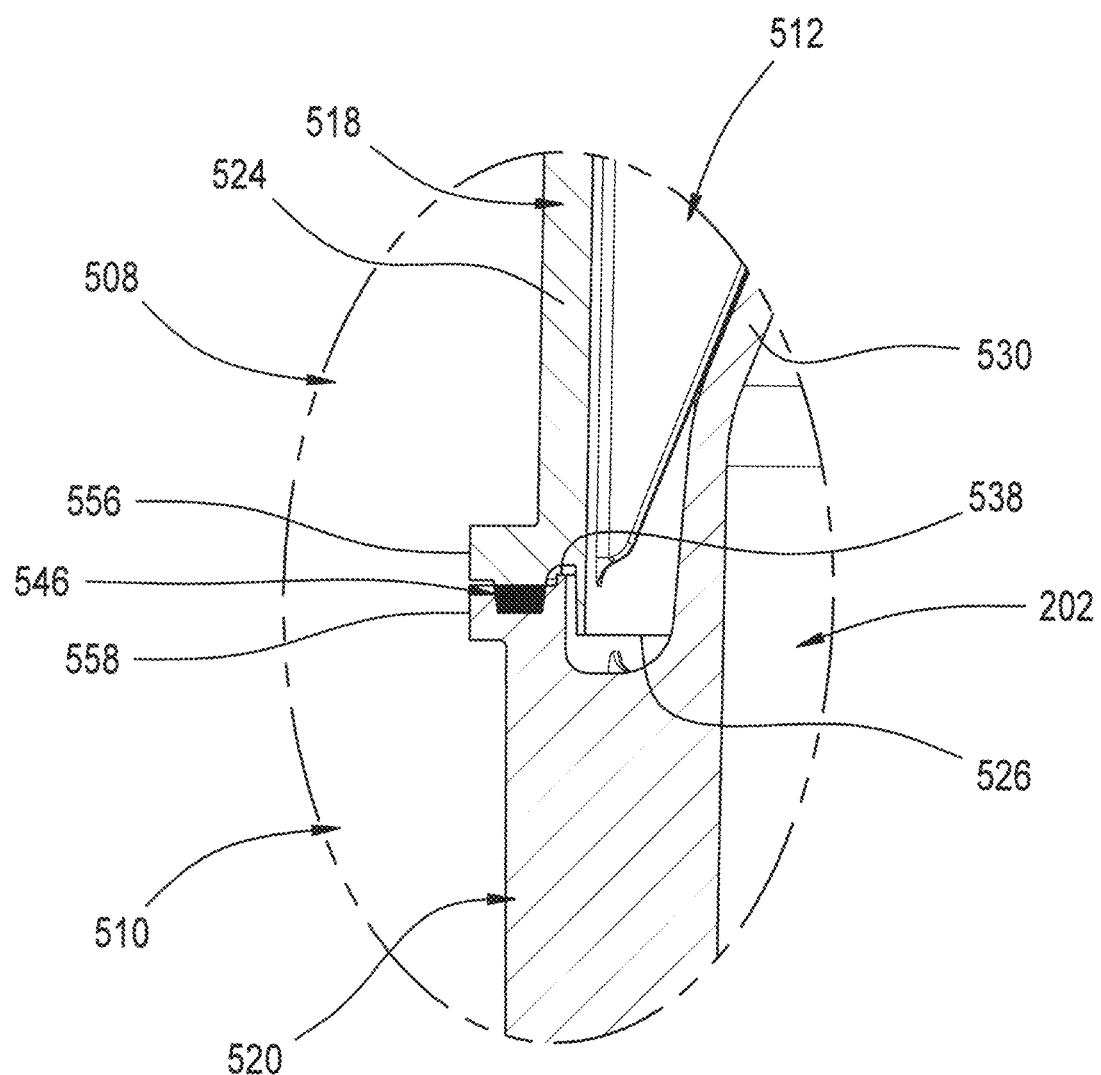
FIG. 7 is an enlarged view of the portion of the end member assembly in FIGS. 2-6 identified as Detail 7 in FIG. 6.
Figure 8:
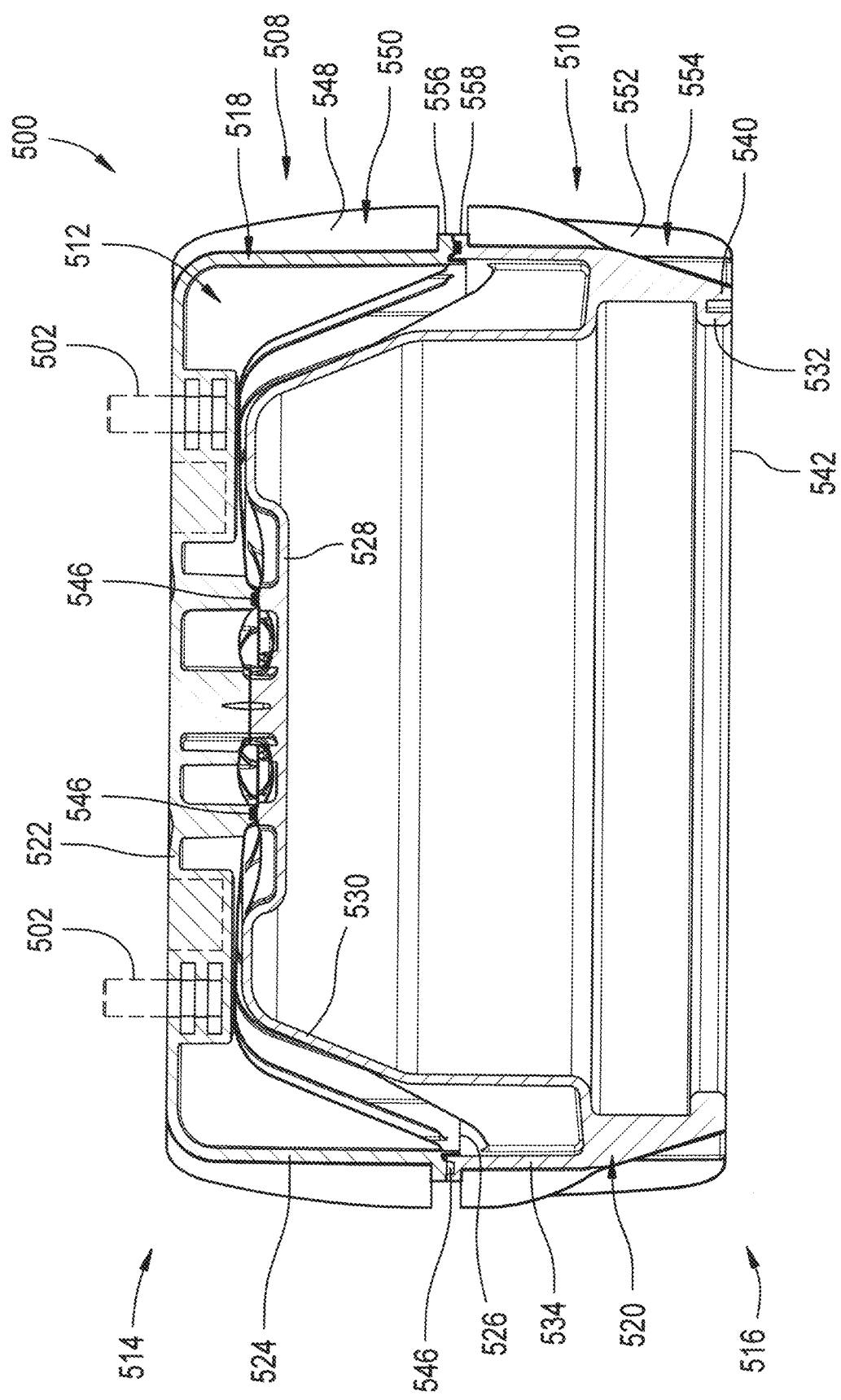
FIG. 8 is a cross-sectional side view of the exemplary end member assembly in FIGS. 2-7 taken from along line 8-8 in FIG. 4.
Figure 9:
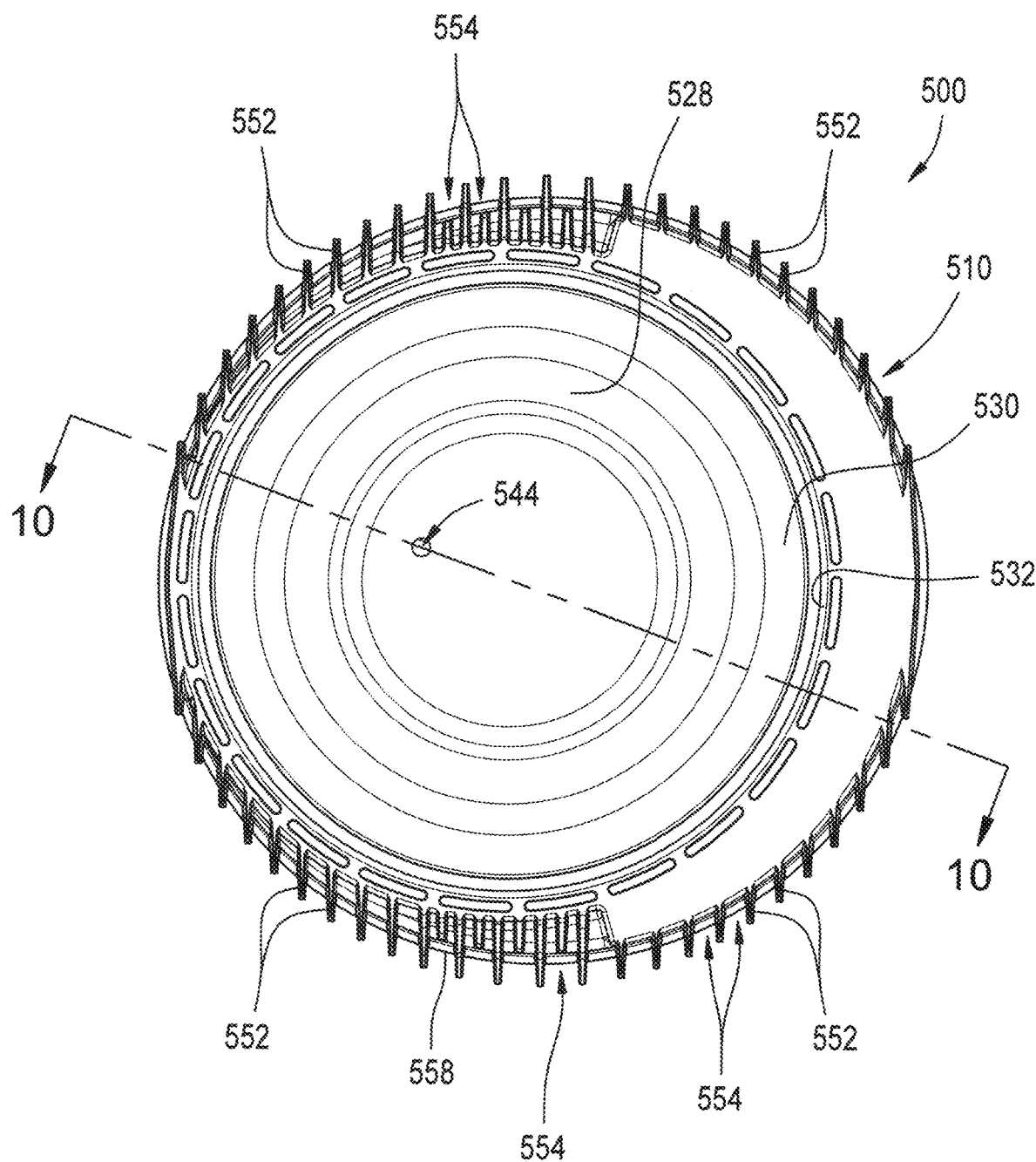
FIG. 9 a bottom plan view of the exemplary end member assembly in FIGS. 2-8.
Figure 10:
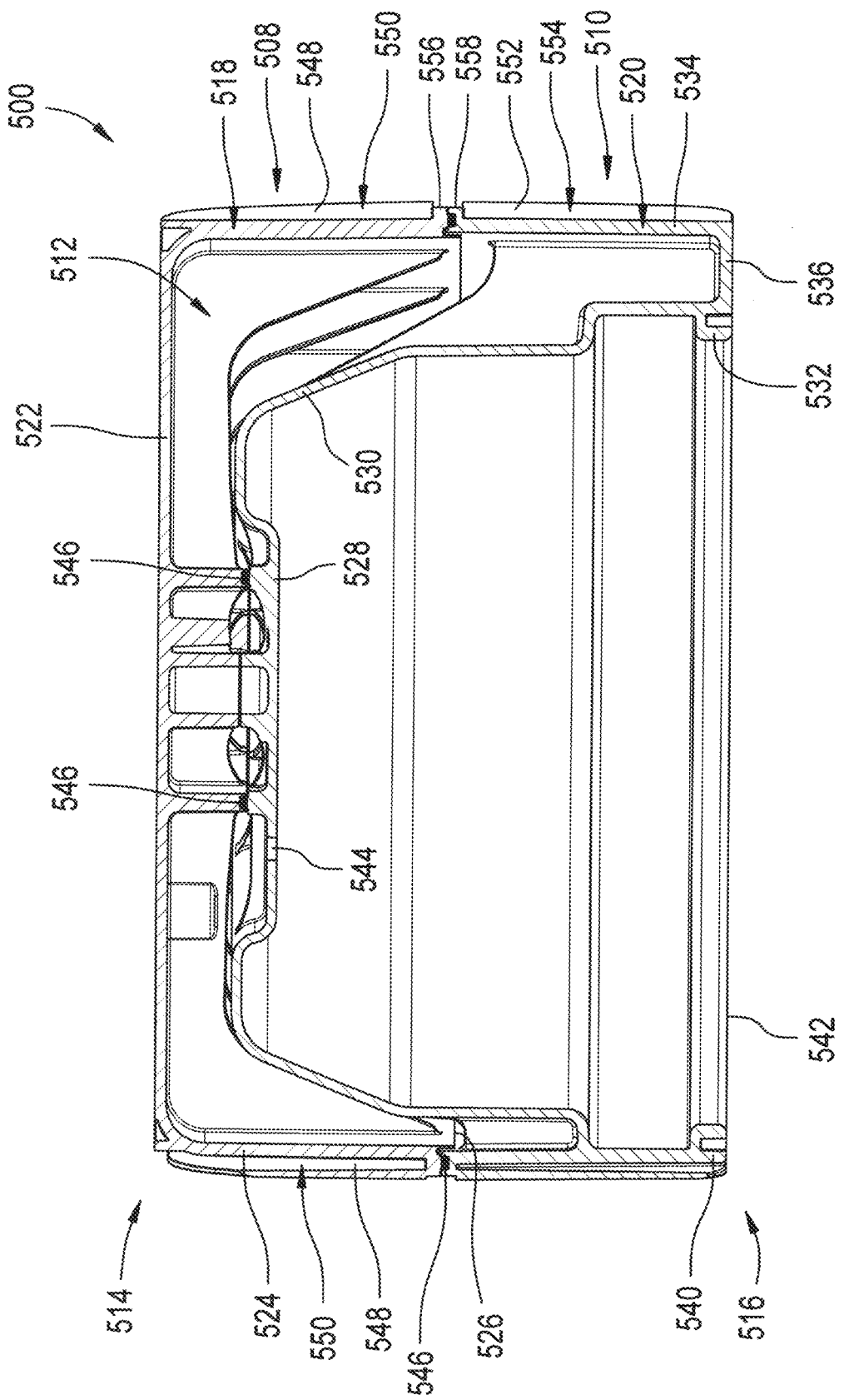
FIG. 10 is a cross-sectional side view of the exemplary end member assembly in FIGS. 2-9 taken from along line 10-10 in FIG. 9.
Figure 11:
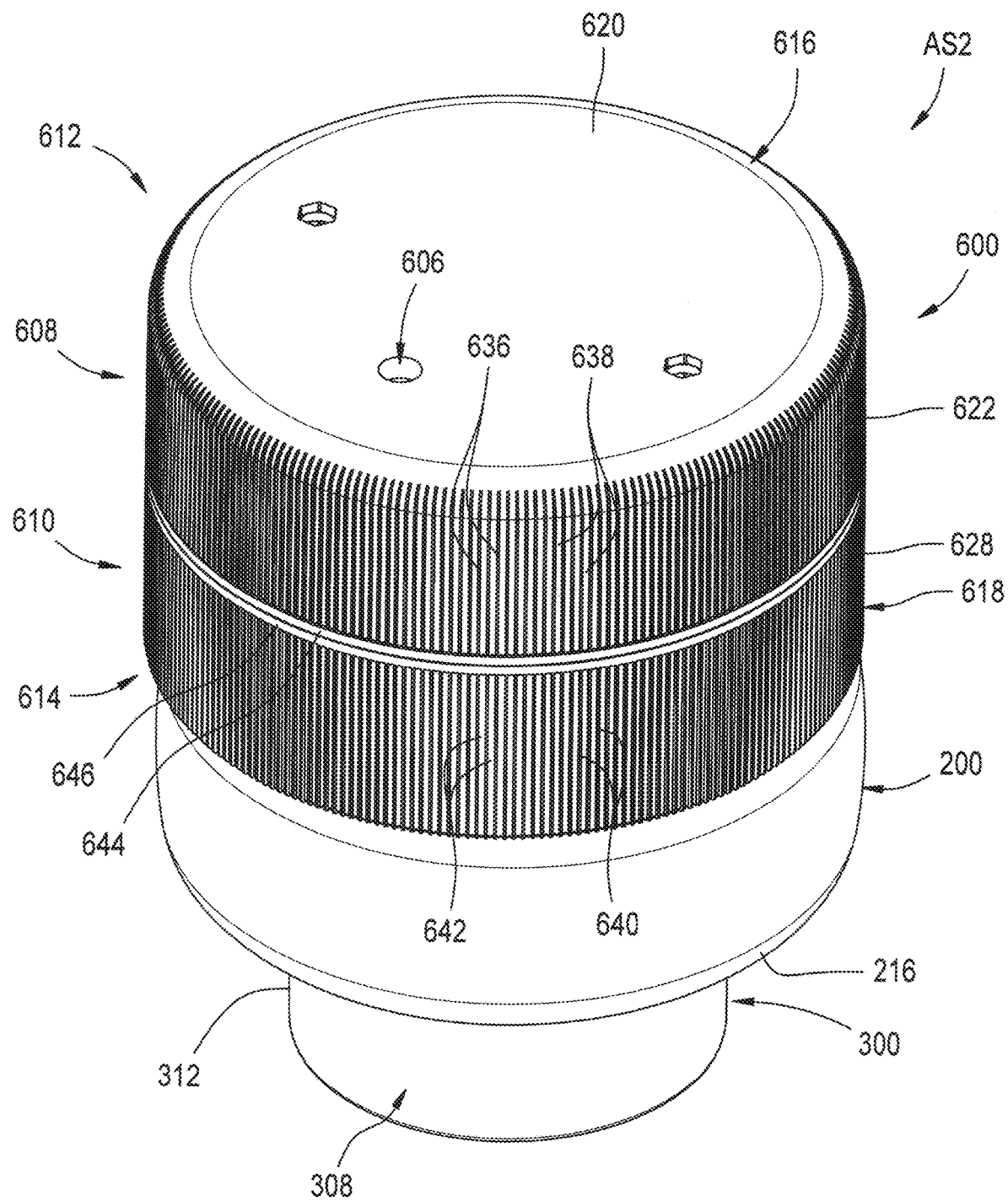
FIG. 11 is a top perspective view of another example of a gas spring assembly in accordance with the subject matter of the present disclosure.

End wall portion 522 and outer side wall portion 524 of first end member section 508 together with outer side wall portion 534 of second end member section 510 at least partially define an exterior of end member assembly 500. In the exemplary construction shown in FIGS. 2-10, end wall portion 528 and inner side wall portion 530 of second end member section 510 are disposed inward of end wall portion 522 and outer side wall portions 524 and 534 such that a gap or space is formed therebetween. It will be appreciated that first and second end member sections 508 and 510 can be secured together in any suitable manner. As one example, distal edge 526 of outer side wall portion 524 and distal edge 538 of outer side wall portion 534 can be disposed adjacent one another with a substantially fluid-tight connection (e.g., a flowed-material joint) formed therebetween, such as is represented in FIG. 7 by item number 546. It will be appreciated, however, that other configurations and/or arrangements could alternately be used.

Additionally, an end member assembly in accordance with the subject matter of the present disclosure is expected to provide improved performance in connection with the incurrence of kinetic impact events such as may be associated with impacts from road debris and/or other foreign objects during use in operation. End member assemblies in accordance with the subject matter of the present disclosure include sacrificial ribs along at least a portion of an exposed exterior of the end member assemblies. These external ribs are dimensioned so that one or more ribs will permanently deform under impact from a foreign object. As the one or more external ribs experiences in impact event, the permanent deformation of the one or more ribs absorbs energy from the object. In accordance with the subject matter of the present disclosure, the external ribs are relatively thin compared to the overall cross-sectional thickness of the end member wall (or wall portion). As such, the force of impact associated with contact by the foreign object may be sufficiently dissipated to allow the integrity of the end member wall to remain intact.

In some cases, however, a kinetic impact event that significantly exceeds the magnitude of force dissipated by the external ribs may occur. In such cases, the fluid-tight integrity of the end member assembly may be compromised. An end member assembly in accordance with the subject matter of the present disclosure can include one or more arrestor bands that extend peripherally around the end member assemblies and inhibit migration of any impact-generated conditions beyond a predetermined maximum length or distance, such as may be established or otherwise at least partially defined by the number and position of any one or more arrestor bands that may be used.

As such, it will be appreciated that an end member assembly in accordance with the subject matter of the present disclosure can include a plurality of ribs disposed in spaced relation to one another along, across and/or around at least a portion of an exterior surface of one or more components of an end member assembly. For example, in the arrangement shown in FIGS. 2-10, section wall 518 of first end member section 508 can include a plurality of ribs (or rib portions) 548 disposed in laterally-offset or laterally-spaced relation to one another along or across the end member assembly or section thereof such that a plurality of grooves (or groove portions) 550 are formed in laterally-offset or laterally-spaced relation to one another along the exterior of the first end member section. It will be appreciated that in the arrangement shown, grooves 550 are disposed between adjacent ones of ribs 548. Additionally, or in the alternative, section wall 520 of second end member section 510 can include a plurality of ribs (or rib portions) 552 disposed in laterally-offset or laterally-spaced relation to one another along or across the end member assembly or section thereof such that a plurality of grooves (or groove portions) 554 are formed in laterally-offset or laterally-spaced relation to one another along the exterior of the second end member section.

It will be appreciated that in the arrangement shown, grooves 554 are disposed between adjacent ones of ribs 552. In the arrangement in FIGS. 2-10, ribs 548 and 552 are shown as begin spaced from one another in a lateral direction with the ribs having a graduated or variable spacing or pitch. It will be appreciated, however, that the spacing or pitch (and, thus, the size of the resulting groove) can be substantially uniform from one end member section to another and/or across or otherwise along a given end member section. Additionally, or in the alternative, the spacing or pitch (and, thus, the size of the resulting groove) can be varied from one end member section to another and/or across or otherwise along a given end member section, such as, for example, may be beneficial to provide for greater kinetic energy dissipation in areas prone to incurring impacts and lesser kinetic energy dissipation in areas with reduced likelihood of impacts. In any case, it will be appreciated that adjacent ones of ribs 548 and/or 552 are disposed in approximate alignment with one another and are spaced apart in a widthwise or lateral direction. In some cases, gas spring assembly AS1 can be installed such that the ribs and corresponding grooves are oriented with reference to a preferred direction of use, such as in approximate alignment with the forward travel direction of a vehicle, such as is represented in FIG. 4 by reference arrows TRV, for example. It will be appreciated, however, that other orientations and/or arrangements could alternately be used.

Figure 5:
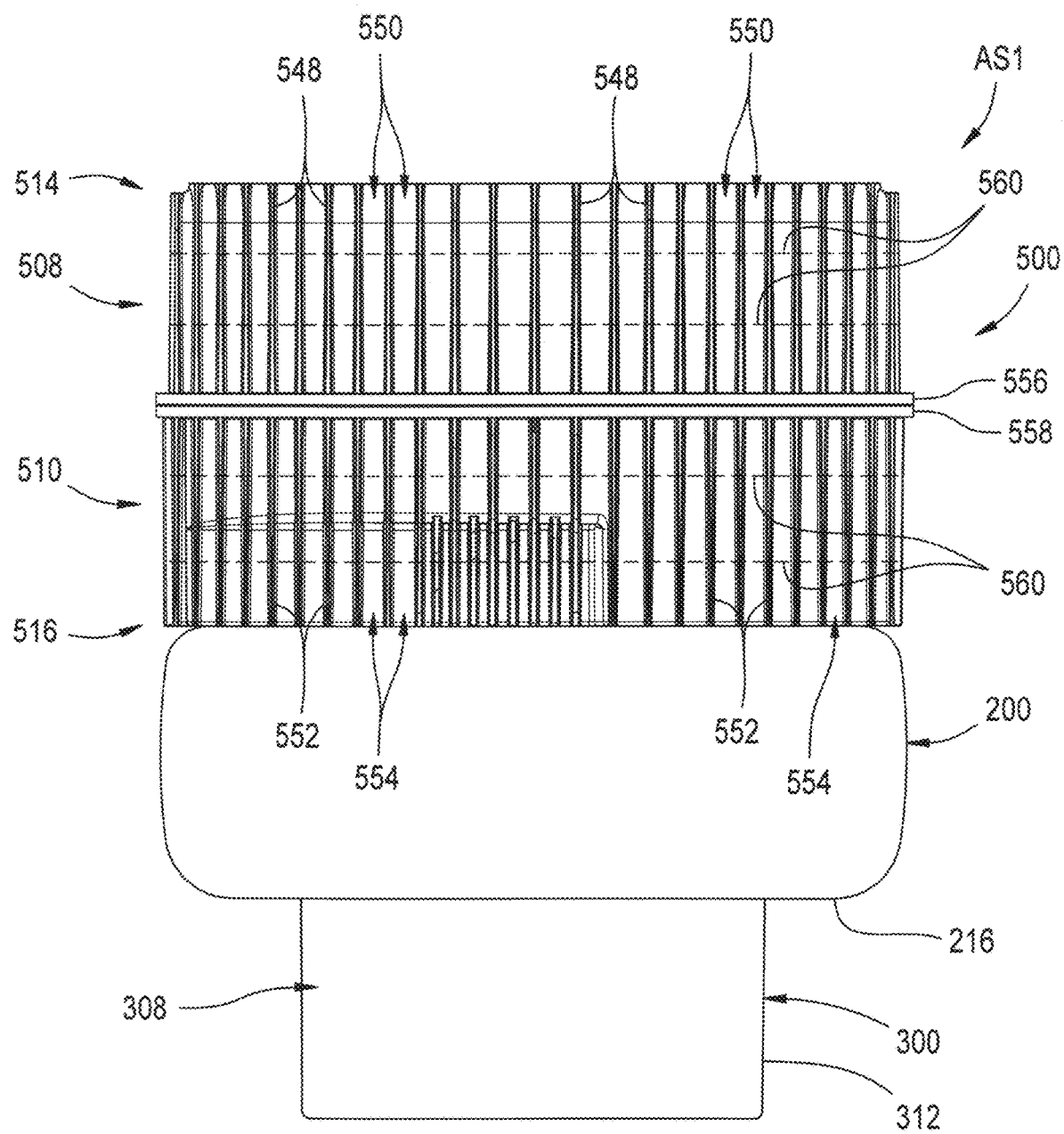
FIG. 5 is a side elevation view of the exemplary gas spring assembly in FIGS. 2-4.

Additionally, it will be appreciated that an end member assembly in accordance with the subject matter of the present disclosure can include one or more peripheral walls (or wall portions) that extend around an exterior surface of one or more components of the end member assembly and are operative to inhibit migration of impact-generated conditions along the end member component beyond a predetermined maximum length or distance. For example, in the arrangement shown in FIGS. 2-10, section wall 518 of first end member section 508 can include a peripheral wall portion 556 that extends annularly around the first end member section. It will be appreciated that ribs 548 extend longitudinally along outer side wall portion 524 and peripheral wall portion 556 extends peripherally around outer side wall portion 524 across grooves 550 and interconnects ribs 548 along a distal end thereof adjacent distal edge 526. Additionally, or in the alternative, section wall 520 of second end member section 510 can include a peripheral wall portion 558 that extends annularly around the second end member section. It will be appreciated that ribs 552 extend longitudinally along outer side wall portion 534 and outer side wall extension portion 540. Peripheral wall portion 558 extends peripherally around outer side wall portion 534 across grooves 554 and interconnects ribs 552 along a distal end thereof adjacent distal edge 538. As indicated above, it will be appreciated that any suitable number of one or more peripheral wall portions can extend around first end member section 508 and/or around second end member section 510. As such, in some cases, two or more peripheral wall portions can be disposed in spaced relation to one another, such as are represented in FIG. 5 by dashed lines 560, as discussed above.

Another example of a gas spring assembly in accordance with the subject matter of the present disclosure will now be described in connection with FIGS. 11-15. As shown therein, a gas spring assembly AS2, such as may be suitable for use as one or more of gas spring assemblies 102 in FIG. 1, for example, is shown as including flexible spring member 200 as well as end member (or end member assembly) 300 that can be secured to the flexible spring member in a suitable manner, such as by way of clamping plate 400, for example, as has been described above in detail. Gas spring assembly AS2 can also include an end member (or end member assembly) 600 in accordance with the subject matter of the present disclosure that is secured to the flexible spring member in a suitable manner in spaced relation to end member 300. Flexible spring member 200 can be secured on or along end members 300 and/or 600 in a substantially fluid-tight manner such that a spring chamber 202 (FIG. 6) is at least partially defined by the flexible spring member between the end members.

Figure 12:
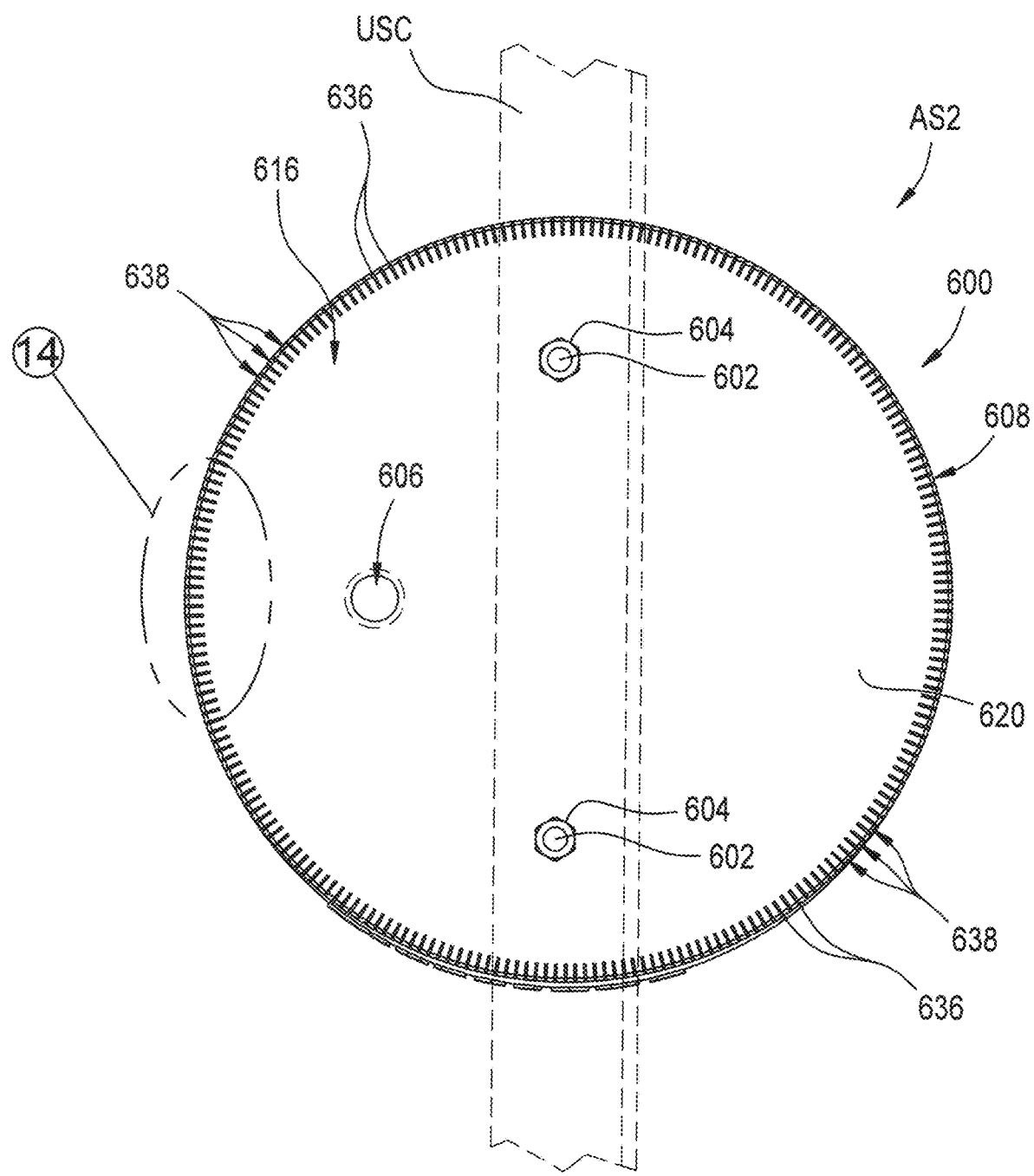
FIG. 12 is a top plan view of the exemplary gas spring assembly in FIG. 11.

Gas spring assembly AS2 can be disposed between associated sprung and unsprung masses of an associated vehicle in any suitable manner. For example, one end member can be operatively connected to the associated sprung mass with the other end member disposed toward and operatively connected to the associated unsprung mass. As shown in FIG. 12, for example, end member assembly 600 can be secured on or along a first or upper structural component USC, such as associated vehicle body BDY in FIG. 1, for example, and can be secured thereon in any suitable manner. For example, one or more securement devices, such as mounting studs 602, for example, can be included along end member assembly 600. In some cases, the one or more securement devices (e.g., mounting studs 602) can project outwardly from end member assembly 600 and can be secured thereon in a suitable manner, such as, for example, by being insert molded and/or by way of a flowed-material joint, a press-fit connection, or a snap-in connection. Additionally, such one or more securement devices can extend through mounting holes (not shown) in upper structural component USC and can receive one or more threaded nuts 604 or other securement devices, for example. As an alternative to one or more of mounting studs 602, one or more threaded passages (e.g., blind passages and/or through passages) could be used in conjunction with a corresponding number of one or more threaded fasteners, for example. Additionally, one or more fluid communication ports, such as transfer passages 606 (FIG. 12), for example, can, optionally, be provided to permit fluid communication with spring chamber 202, such as may be used for transferring pressurized gas into and/or out of the spring chamber, for example. It will be appreciated, however, that any other suitable fluid communication arrangement could alternately be used.

End member (or end member assembly) 600 can be operatively secured along or across end 206 of flexible spring member 200 such that a substantially fluid-tight seal is formed therebetween. End member assembly 600 can take the form of a reservoir end member that includes at least one end member wall that defines an end member chamber. In the arrangement shown, end member assembly 600 includes a first or upper section 608 and a second or lower section 610 that are operatively attached to one another to at least partially form end member assembly 600. In an assembled condition, one or more of first and second sections 608 and 610 can at least partially define an end member chamber, such as has been described above in connection with end member chamber 512 of end member assembly 500. It will be appreciated, however, that other constructions and/or configurations can alternately be used without departing from the subject matter of the present disclosure.

End member assembly 600 can extend longitudinally between a first end 612 and a second end 614. First end member section 608 can include a section wall 616 with one or more section wall portions and second end member section 610 can include a section wall 618 with one or more section wall portions. Section wall 616 can include an end wall portion 620 oriented transverse to longitudinal axis AX (FIG. 6) and along which mounting studs 602 can be secured and/or along which transfer passage 606 can be provided. Section wall 616 can also include an outer side wall portion 622 that extends lengthwise from along end wall portion 620 and/or first end 614 in a direction toward second end 616 to a distal edge 624. Section wall 618 can include an end wall portion 626 that is oriented transverse to longitudinal axis AX as well as an outer side wall portion 628 that extends from along end wall portion 626 in a direction toward first end member section 608 to a distal edge 630.

Figure 13:
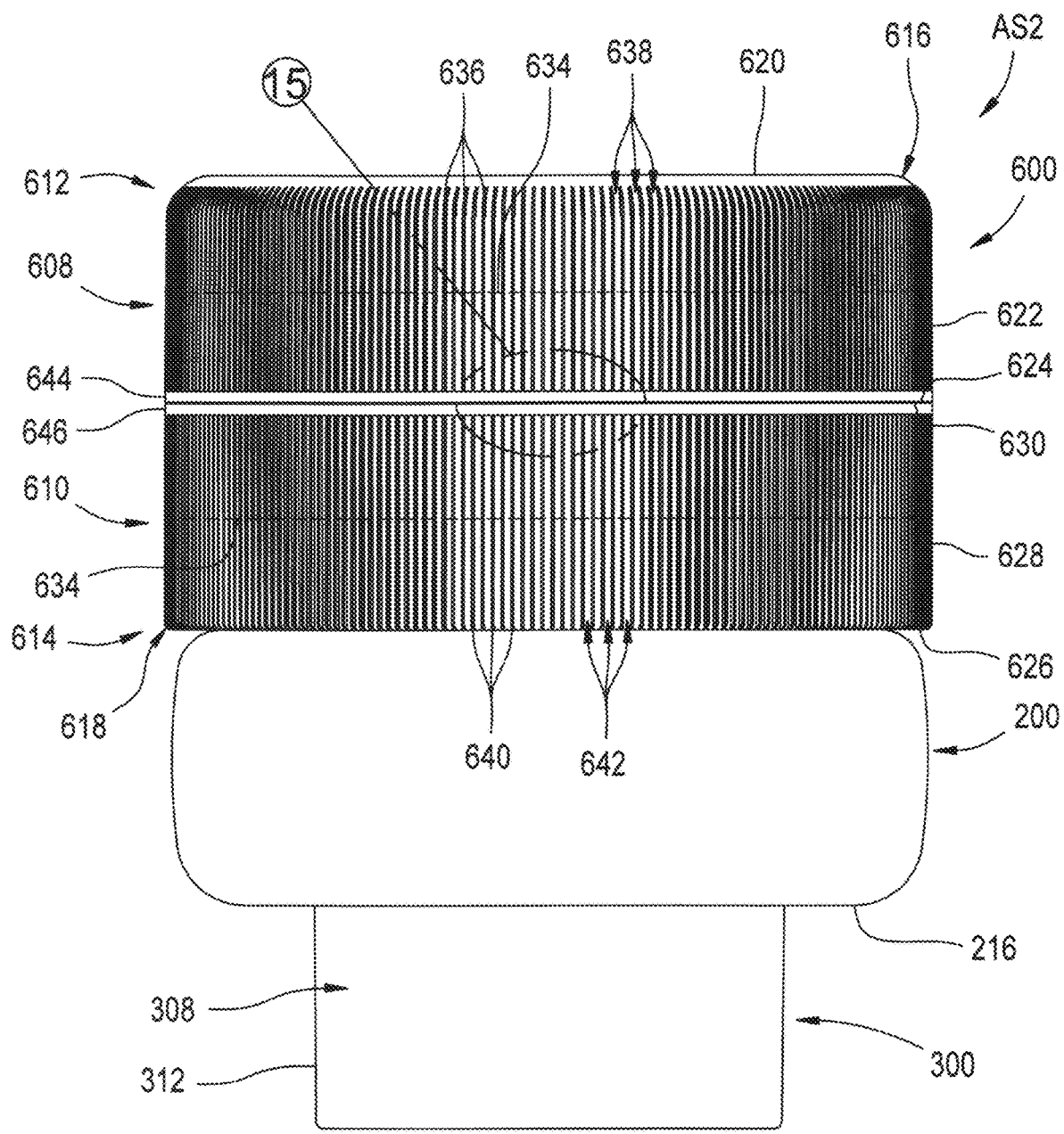
FIG. 13 is a side elevation view of the exemplary gas spring assembly in FIGS. 11 and 12.
Figure 14:
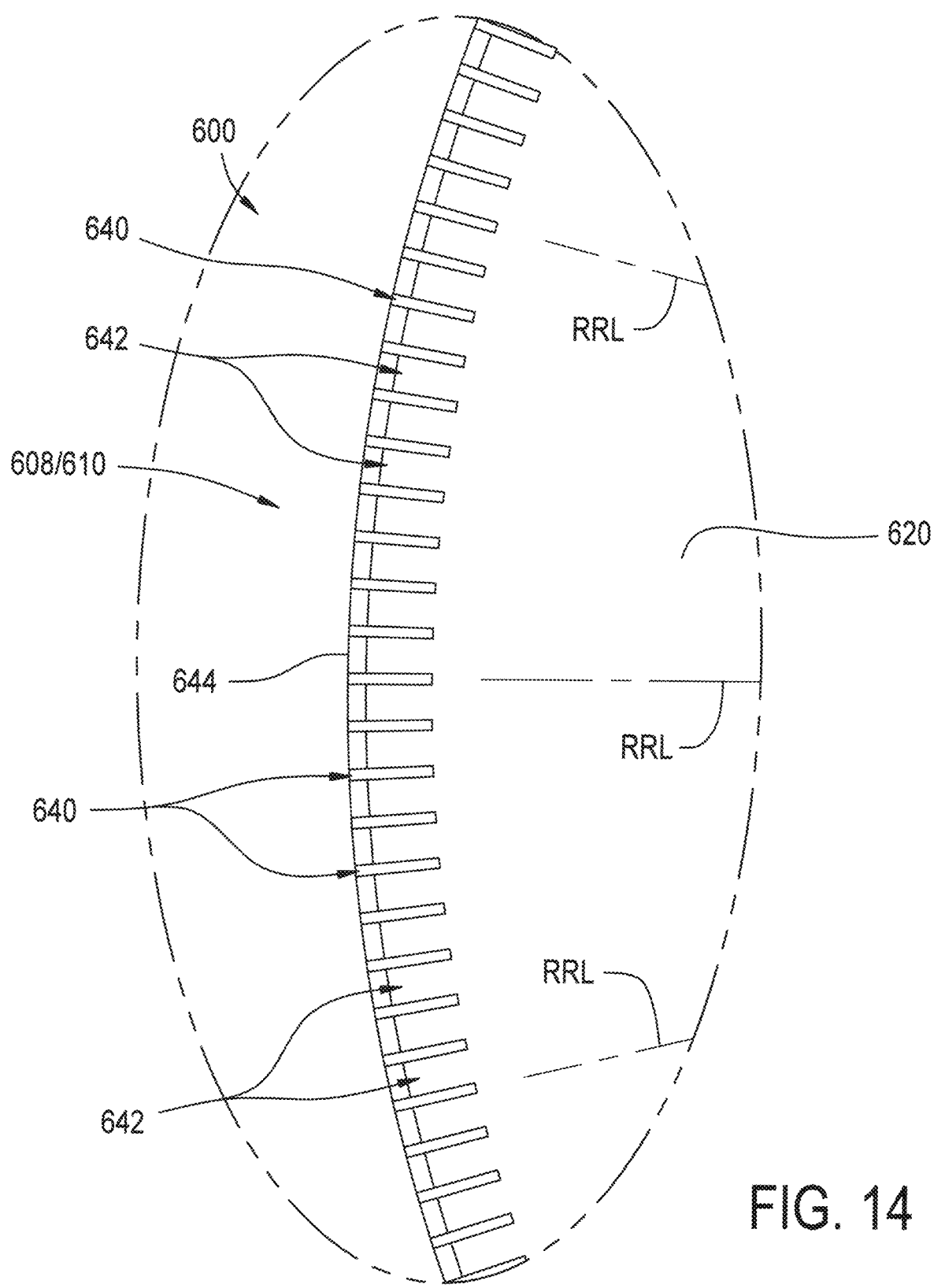
FIG. 14 is an enlarged view of the portion of the end member assembly in FIGS. 11-13 identified as Detail 14 in FIG. 12.
Figure 15:
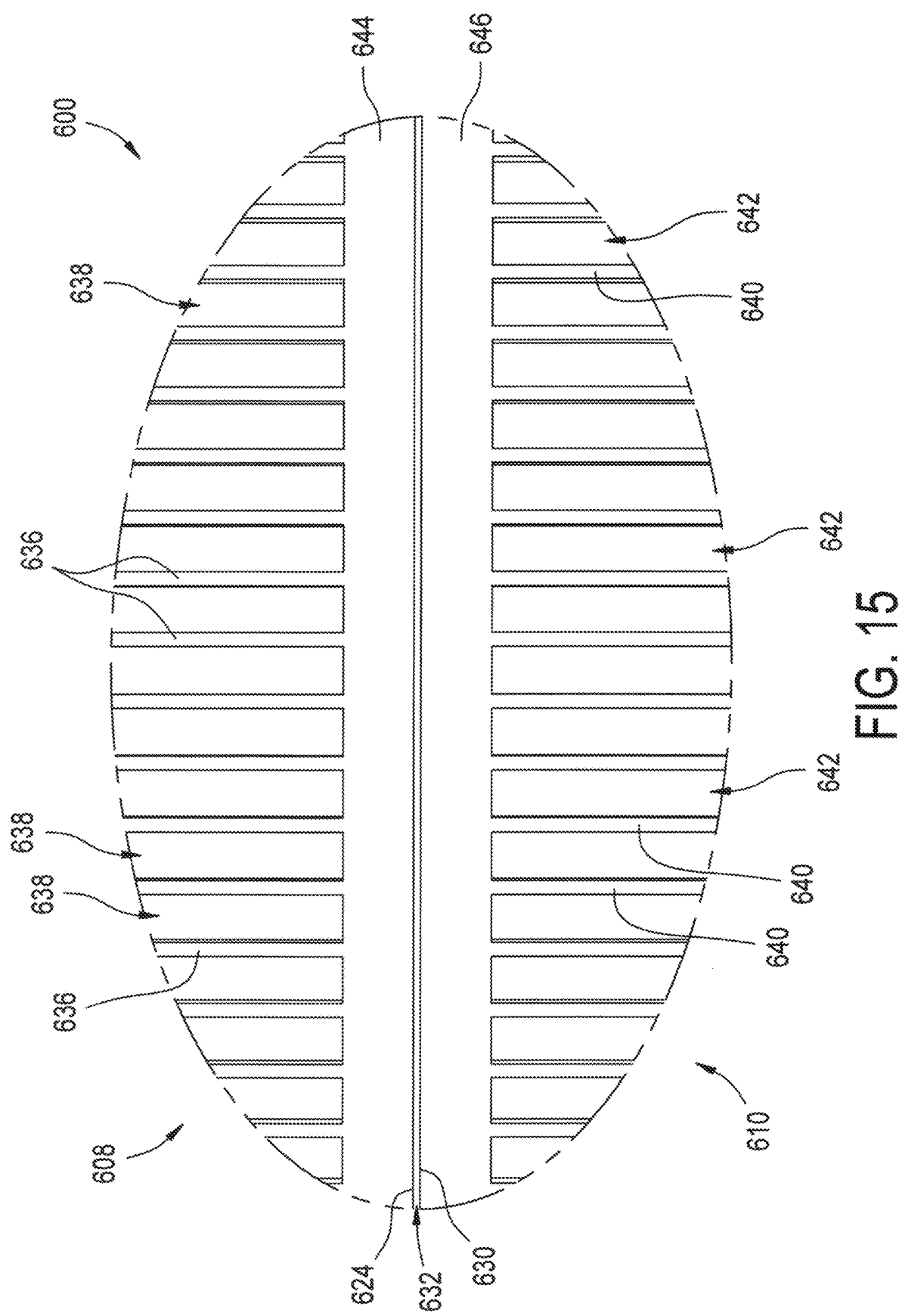
FIG. 15 is an enlarged view of the portion of the end member assembly in FIGS. 11-14 identified as Detail 15 in FIG. 13.

In an assembled condition of end member assembly 600, one or more walls and/or wall portions of one or more of first and second end member sections 608 and 610 at least partially define end member chamber, such as end member chamber 512. It will be appreciated that first and second end member sections 608 and 610 can be secured together in any suitable manner. As one example, distal edge 624 of outer side wall portion 622 and distal edge 630 of outer side wall portion 628 can be disposed adjacent one another with a substantially fluid-tight connection (e.g., a flowed-material joint) formed therebetween, such as is represented in FIGS. 13 and 15 by item number 632. It will be appreciated, however, that other configurations and/or arrangements could alternately be used.

It will be appreciated that end member assembly 600 including either or both of end member sections 608 and/or 610 can be otherwise constructed in a manner substantially similar to end member assembly 500 including either or both of end member sections 508 and/or 510, which are shown and described in detail in connection with FIGS. 2-10. For purposes of brevity and ease of reading, a detailed description of the walls and/or wall portions of end member sections 608 and 610 is not repeated here. It is to be recognized and understood, however, that the foregoing description of end member sections 508 and/or 510, including all of the walls, wall portions, features and functions thereof as well as any components that associated therewith, is equally applicable to end member sections 608 and 610 as if recited in full detail herein.

As discussed above, an end member assembly in accordance with the subject matter of the present disclosure is expected to provide improved performance in connection with the incurrence of kinetic impact events such as may be associated with impacts from road debris and/or other foreign objects during use in operation. End member assemblies in accordance with the subject matter of the present disclosure include sacrificial ribs along at least a portion of an exposed exterior of the end member assemblies. These external ribs are dimensioned so that one or more ribs will permanently deform under impact from a foreign object. As the one or more external ribs experiences in impact event, the permanent deformation of the one or more ribs absorbs energy from the object. In accordance with the subject matter of the present disclosure, the external ribs are relatively thin compared to the overall cross-sectional thickness of the end member wall (or wall portion). As such, the force of impact associated with contact by the foreign object may be sufficiently dissipated to allow the integrity of the end member wall to remain intact.

In some cases, however, a kinetic impact event that significantly exceeds the magnitude of force dissipated by the external ribs may occur. In such cases, the fluid-tight integrity of the end member assembly may be compromised. An end member assembly in accordance with the subject matter of the present disclosure can include one or more arrestor bands that extend peripherally around the end member assemblies and inhibit migration of any impact-generated conditions beyond a predetermined maximum length or distance, such as may be established or otherwise at least partially defined by the number and position of any one or more arrestor bands that may be used, such as are represented in FIG. 13 by dashed lines 634.

An end member assembly in accordance with the subject matter of the present disclosure can include a plurality of ribs disposed in spaced relation to one another across, along or around at least a portion of an exterior surface of one or more components of an end member assembly. In the arrangement shown in FIGS. 11-15, section wall 616 of first end member section 608 can include a plurality of ribs (or rib portions) 636 disposed in peripherally-spaced relation to one another about longitudinal axis AX such that a plurality of grooves (or groove portions) 638 are formed in peripherally-spaced relation to one another along the exterior of the first end member section. It will be appreciated that in the arrangement shown, grooves 638 are disposed between adjacent ones of ribs 636. Additionally, or in the alternative, section wall 618 of second end member section 610 can include a plurality of ribs (or rib portions) 640 disposed in peripherally-spaced relation to one another about longitudinal axis AX such that a plurality of grooves (or groove portions) 642 are formed in peripherally-spaced relation to one another along the exterior of the second end member section. It will be recognized from at least FIGS. 11-15 that ribs 636 and/or 640 as well as the corresponding grooves formed thereby are disposed in a radial orientation, as is represented by radial reference lines RRL in FIG. 14, rather than being oriented in laterally offset relation to one another, such as is shown and described in connection with end member sections 508 and/or 510, for example. Again, it will be appreciated that in the arrangement shown, grooves 642 are disposed between adjacent ones of ribs 640. In the arrangement in FIGS. 11-15, ribs 636 and 640 are shown as having an approximately uniform spacing or pitch. It will be appreciated, however, that the spacing or pitch (and, thus, the size of the resulting groove) can be varied from one end member section to another and/or across, along and/or around the periphery of a given end member section, such as, for example, may be beneficial to provide for greater kinetic energy dissipation in areas prone to incurring impacts and lesser kinetic energy dissipation in areas with reduced likelihood of impacts.

Additionally, it will be appreciated that an end member assembly in accordance with the subject matter of the present disclosure can include one or more peripheral walls (or wall portions) that extend around an exterior surface of one or more components of the end member assembly and are operative to inhibit migration of impact-generated conditions along the end member component beyond a predetermined maximum length or distance. For example, in the arrangement shown in FIGS. 2-10, section wall 616 of first end member section 608 can include a peripheral wall portion 644 that extends annularly around the first end member section. It will be appreciated that ribs 636 extend longitudinally along outer side wall portion 622 and peripheral wall portion 644 extends peripherally around outer side wall portion 622 across grooves 638 and interconnects ribs 636 along a distal end thereof adjacent distal edge 624. Additionally, or in the alternative, section wall 618 of second end member section 610 can include a peripheral wall portion 646 that extends annularly around the second end member section. It will be appreciated that ribs 640 extend longitudinally along outer side wall portion 628. Peripheral wall portion 646 extends peripherally around outer side wall portion 628 across grooves 642 and interconnects ribs 640 along a distal end thereof adjacent distal edge 630. As indicated above, it will be appreciated that any suitable number of one or more peripheral wall portions can extend around first end member section 608 and/or around second end member section 610. As such, in some cases, two or more peripheral wall portions can be disposed in spaced relation to one another, such as are represented in FIG. 13 by dashed lines 634, as discussed above.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different structures, features and/or components are presented in the embodiments shown and described herein, and that no one embodiment may be specifically shown and described as including all such structures, features and components. As such, it is to be understood that the subject matter of the present disclosure is intended to encompass any and all combinations of the different structures, features and components that are shown and described herein, and, without limitation, that any suitable arrangement of structures, features and components, in any combination, can be used. Thus, it is to be distinctly understood claims directed to any such combination of structures, features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112 (f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly comprising:
a flexible spring member having a longitudinal axis and extending between opposing first and second ends, said flexible spring member including a flexible wall extending peripherally about said longitudinal axis to at least partially define a spring chamber;
an end member assembly secured across said first end of said flexible spring member such that a substantially fluid-tight connection is formed therebetween, said end member assembly including:
a first end member section having a longitudinal axis and including a first end member wall portion extending peripherally about said longitudinal axis and longitudinally from a first end toward a second end, said first end member wall portion at least partially defining an exterior of said first end member section and including a plurality of first ribs outwardly exposed along said exterior of said first end member section with said plurality of first ribs disposed in spaced relation to one another such that a plurality of first grooves are formed with one of said plurality of first grooves disposed between two of said plurality of first ribs; and,
a second end member section permanently attached to said first end member section by way of a flowed-material joint such that said first and second end member sections are secured and maintained in a fixed axial position relative to one another, said second end member section including a second end member wall portion extending peripherally about said longitudinal axis and longitudinally from a first end toward a second end, said second end member wall portion at least partially defining an exterior of said second end member section and including a plurality of second ribs outwardly exposed along said exterior of said second end member section with said plurality of second ribs disposed in spaced relation to one another such that a plurality of second grooves are formed with one of said plurality of second grooves disposed between two of said plurality of second ribs;
at least one of said plurality of first ribs and at least one of said plurality of second ribs dimensioned for permanent deflection into a respectively adjacent one of said plurality of first grooves and said plurality of second grooves upon undergoing a kinetic impact from an associated foreign object; and,
an end member secured across said second end of said flexible spring member such that a substantially fluid-tight connection is formed therebetween.

2. A gas spring assembly according to 1, wherein said first end member wall portion of said first end member section of said end member assembly includes a first peripheral wall portion disposed along said first end thereof, said first peripheral wall portion including a first outer peripheral surface portion facing radially outward along said exterior of said first end member section, said first outer peripheral surface portion extending substantially continuously about said longitudinal axis, and said first peripheral wall portion extending across said plurality of first grooves and operatively interconnecting said plurality of first ribs.

3. A gas spring assembly according to claim 2, wherein said second end member wall portion of said second end member section of said end member assembly includes a second peripheral wall portion disposed along said first end thereof, said second peripheral wall portion including a second outer peripheral surface portion facing radially outward along said exterior of said second end member section, said second outer peripheral surface portion extending substantially continuously about said longitudinal axis, and said second peripheral wall portion extending across said plurality of second grooves and operatively interconnecting said plurality of second ribs.

4. A gas spring assembly according to claim 3, wherein said first ends of said first and second end member sections are oriented toward one another such that said first and second peripheral wall portions are disposed adjacent one another with said flowed-material joint disposed adjacent at least one of said first and second peripheral wall portions.

5. A gas spring assembly according to claim 3, wherein said first ends of said first and second end member sections are oriented toward one another such that said first and second peripheral wall portions are disposed adjacent one another with said flowed-material joint co-extensively overlapping at least one of said first and second peripheral wall portions.

6. A gas spring assembly according to 1, wherein said first end member section is dimensioned along said second end thereof for securement to an associated structural component, said second end of said second end member section is secured to said flexible spring member, and said flowed-material joint is formed between said first and second peripheral wall portions along said first ends of said first and second end member sections.

7. A gas spring assembly according to 1, wherein adjacent ones of said plurality of first ribs are disposed a first, approximately-uniform distance from one another, and/or adjacent ones of said plurality of second ribs are disposed a second, approximately-uniform distance from one another.

8. A gas spring assembly according to claim 7, wherein said first, approximately-uniform distance and said second, approximately-uniform distance are approximately equal to one another.

9. A gas spring assembly according to 1, wherein adjacent ones of said plurality of first ribs are disposed in a graduated spacing pattern relative to one another, and/or adjacent ones of said plurality of second ribs are disposed in a graduated spacing pattern relative to one another.

10. A gas spring assembly according to claim 1, wherein adjacent ones of said plurality of first ribs are disposed in a laterally-offset spacing pattern relative to one another, and/or adjacent ones of said plurality of second ribs are disposed in a laterally-offset spacing pattern relative to one another.

11. A gas spring assembly according to claim 1, wherein adjacent ones of said plurality of first ribs are disposed in a radial orientation around said longitudinal axis, and/or adjacent ones of said plurality of second ribs are disposed in a radial orientation around said longitudinal axis.

12. A gas spring assembly according to claim 1, wherein said first and second end member sections at least partially define an end member chamber with said end member chamber disposed in fluid communication with said spring chamber through a gas damping port extending through one of said first and second end member sections.

13. A gas spring assembly comprising:
a flexible spring member having a longitudinal axis and extending between opposing first and second ends, said flexible spring member including a flexible wall extending peripherally about said longitudinal axis to at least partially define a spring chamber; and,
an end member assembly secured across said first end of said flexible spring member such that a substantially fluid-tight connection is formed therebetween, said end member assembly including first and second end member walls, said first end member wall including:
a first side wall portion extending peripherally about said longitudinal axis and at least partially forming an exterior of said end member assembly;
a peripheral wall portion including an outer peripheral surface portion facing radially outward along said exterior of said end member assembly and extending substantially continuously about said longitudinal axis; and,
a plurality of first ribs extending outwardly from along said first side wall portion and longitudinally along one side of said peripheral wall portion such that said plurality of first ribs are exposed along said exterior of said end member assembly, said plurality of first ribs disposed in spaced relation to one another such that a plurality of first grooves extend longitudinally away from said peripheral wall portion along said one side thereof with one of said plurality of first grooves disposed between adjacent ones of said plurality of first ribs; and,
said second end member wall including:
a second side wall portion positioned along an opposite side of said peripheral wall portion from said first side wall portion, said second side wall portion extending peripherally about said longitudinal axis and at least partially forming said exterior of said end member assembly; and,
a plurality of second ribs extending outwardly from along said second side wall portion and longitudinally along said opposite side of said peripheral wall portion such that said plurality of second ribs are exposed along said exterior of said end member assembly, said plurality of second ribs disposed in spaced relation to one another such that a plurality of second grooves extend longitudinally away from said peripheral wall portion along said opposite side thereof with one of said plurality of second grooves disposed between adjacent ones of said plurality of second ribs;
said first and second side wall portions permanently attached to one another in a fixed axial position relative to one another by way of said flowed-material joint to at least partially form said end member assembly with said plurality of first ribs and said plurality of second ribs dimensioned for permanent deflection into a respectively adjacent ones of said plurality of first grooves and said plurality of second grooves upon undergoing a kinetic impact from an associated foreign object.

14. A gas spring assembly according to claim 13, wherein said peripheral wall portion is a first peripheral wall portion, and said end member assembly includes a second peripheral wall portion positioned adjacent said first peripheral wall portion with said flowed-material joint operatively disposed therebetween.

15. A gas spring assembly according to claim 13, wherein said end member assembly includes an end wall portion disposed in axially-spaced relation to said peripheral wall portion with said plurality of first ribs and said plurality of first grooves extending longitudinally from said peripheral wall portion toward said end wall portion.

16. A gas spring assembly according to claim 13, wherein said end member assembly includes a first end member section and a second end member section operatively connected to said first end member section by way of said flowed-material joint.

17. A gas spring assembly according to claim 16, wherein said plurality of first ribs are disposed along said first end member section and said plurality of second ribs are disposed along said second end member section, and said peripheral wall portion is a first peripheral wall portion disposed along said first end member section, and said end member assembly includes a second peripheral wall portion disposed along said second end member section.

18. A gas spring assembly according to claim 13, wherein said side wall portion at least partially defines an end member chamber in fluid communication with said spring chamber through a gas damping port.

19. A gas spring assembly comprising:
a flexible spring member having a longitudinal axis and extending between opposing first and second ends, said flexible spring member including a flexible wall extending peripherally about said longitudinal axis to at least partially define a spring chamber;
an end member assembly secured across said first end of said flexible spring member such that a substantially fluid-tight connection is formed therebetween, said end member assembly including:
a first end member section having a longitudinal axis and including a first section wall with an end wall portion oriented transverse to said longitudinal axis and a first side wall portion extending peripherally about said longitudinal axis from along said end wall portion toward a first distal edge, said first side wall portion at least partially defining an exterior of said first end member section, said first section wall including a plurality of first ribs extending outwardly from said first side wall portion and longitudinally therealong such that said plurality of first ribs are exposed along said exterior of said first end member section, said plurality of first ribs disposed in spaced relation to one another such that a plurality of first grooves are formed with one of said plurality of first grooves disposed between adjacent ones of said plurality of first ribs, and said first section wall including a first peripheral wall portion disposed along said first distal edge of said first end member section, said first peripheral wall portion including a first outer peripheral surface portion facing radially outward along said exterior of said first end member section, said first outer peripheral surface portion extending substantially continuously about said longitudinal axis such that said first peripheral wall portion operatively interconnects at least said plurality of first ribs; and, a second end member section including a second section wall with a second side wall portion extending peripherally about said longitudinal axis and extending axially toward a second distal edge, said second side wall portion at least partially defining an exterior of said second end member section, said second section wall including a plurality of second ribs extending outwardly from said second side wall portion and longitudinally therealong such that said plurality of second ribs are exposed along said exterior of said second end member section, said plurality of second ribs disposed in spaced relation to one another such that a plurality of second grooves are formed with one of said plurality of second grooves disposed between adjacent ones of said plurality of second ribs, and said second section wall including a second peripheral wall portion disposed along said second distal edge of said second end member section, said second peripheral wall portion including a second outer peripheral surface portion facing radially outward and extending substantially continuously about said longitudinal axis such that said second peripheral wall portion operatively interconnects at least said plurality of second ribs;

said first and second end member sections oriented such that said first and second distal edges are disposed toward one another, said first and second end member sections permanently attached to one another by a flowed-material joint such that said first and second end member sections are secured and maintained in a fixed axial position relative to one another with at least one of said plurality of first ribs and at least one of said plurality of second ribs dimensioned for permanent deflection into a respectively adjacent one of said plurality of first grooves and said plurality of second grooves upon undergoing a kinetic impact from an associated foreign object; and, an end member secured across said second end of said flexible spring member such that a substantially fluid-tight connection is formed therebetween.

\* \* \* \* \*